United States Patent
Liu et al.

(10) Patent No.: US 11,770,281 B2
(45) Date of Patent: Sep. 26, 2023

(54) SYMBOL PROCESSING METHOD AND APPARATUS

(71) Applicant: HUAWEI TECHNOLOGIES CO., LTD., Shenzhen (CN)

(72) Inventors: Fengwei Liu, Chengdu (CN); Huang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/573,318

(22) Filed: Jan. 11, 2022

(65) Prior Publication Data

US 2022/0131730 A1   Apr. 28, 2022

Related U.S. Application Data

(63) Continuation of application No. PCT/CN2020/100214, filed on Jul. 3, 2020.

(30) Foreign Application Priority Data

Jul. 12, 2019   (CN) .......................... 201910631996.9

(51) Int. Cl.
*H04L 27/26* (2006.01)
*H04L 25/03* (2006.01)

(52) U.S. Cl.
CPC .... *H04L 27/2607* (2013.01); *H04L 25/03178* (2013.01)

(58) Field of Classification Search
CPC ............. H04L 27/2602; H04L 27/2613; H04L 25/03821; H04L 27/2601; H04L 27/2607

(Continued)

(56) References Cited

U.S. PATENT DOCUMENTS

| 9,313,063 B1 | 4/2016 | Jia et al. | |
|---|---|---|---|
| 2005/0163238 A1* | 7/2005 | Fujii | ..................... H04L 5/0007 375/E1.005 |
| 2005/0219998 A1 | 10/2005 | Kumar et al. | |
| 2009/0221282 A1* | 9/2009 | Lee | ....................... H04W 24/10 455/424 |

(Continued)

FOREIGN PATENT DOCUMENTS

| CN | 105580302 A | 5/2016 |
|---|---|---|
| CN | 107852254 A | 3/2018 |

(Continued)

OTHER PUBLICATIONS

Utsaw Kumar et al., A Waveform for 5G: Guard Interval DFT-s-OFDM. 2015 IEEE Globecom Workshops (GC Wkshps), Feb. 25, 2016, 6 pages.

(Continued)

*Primary Examiner* — Emmanuel Bayard
(74) *Attorney, Agent, or Firm* — Rimon PC

(57) ABSTRACT

This application provides a symbol processing method and related apparatus. The method includes: dividing a plurality of obtained complex-valued symbols into a plurality of sets, where each set corresponds to one transmit symbol, and the plurality of sets include a first set corresponding to a first transmit symbol; and mapping a first sequence and a second sequence to the first set, where an end position of the first sequence is a position of intercepting a cyclic prefix (CP) in the first transmit symbol, and an end position of the second sequence is an end position of the first transmit symbol. By mapping the sequences to the sets, an original cyclic prefix (CP) can be extended using a sequence with a flexible length, and flexible guard periods of different lengths can be configured for different users by adjusting the length of the sequences.

12 Claims, 12 Drawing Sheets

(58) Field of Classification Search
USPC .................................. 375/260, 295, 297
See application file for complete search history.

(56) References Cited

U.S. PATENT DOCUMENTS

| | | | |
|---|---|---|---|
| 2010/0111017 A1* | 5/2010 | Um | H04L 27/2601 370/329 |
| 2012/0327975 A1* | 12/2012 | Michaels | H04J 13/0074 375/140 |
| 2015/0078477 A1* | 3/2015 | Hong | H04L 5/0025 375/295 |
| 2017/0339697 A1* | 11/2017 | Park | H04L 27/2602 |
| 2018/0219709 A1 | 8/2018 | Pawar et al. | |
| 2018/0367355 A1 | 12/2018 | Pan et al. | |
| 2020/0052948 A1* | 2/2020 | Sahin | H04L 27/2607 |

FOREIGN PATENT DOCUMENTS

| | | | | |
|---|---|---|---|---|
| CN | 109417451 A | 3/2019 | | |
| CN | 109644109 A | 4/2019 | | |
| EP | 3247079 A1 * | 11/2017 | ........... | H04L 27/262 |
| WO | 2016114824 A1 | 7/2016 | | |
| WO | WO-2018040815 A1 * | 3/2018 | ......... | H04L 27/2613 |

OTHER PUBLICATIONS

Huawei, HiSilicon, UE-group common control signaling. 3GPP TSG-RAN WG1 Meeting #88, Athens, Greece, Feb. 13, 17, 2017, R1-1701637, 3 pages.

Mitsubishi Electric, UW DFTsOFDM performance evaluation above 40GHz. 3GPP TSG-RAN WG1 NR-AH 1701, Spokane, Washington, Jan. 16-20, 2017, R1-1700649, 10 pages.

* cited by examiner

SYMBOL PROCESSING METHOD AND APPARATUS

CROSS-REFERENCE TO RELATED APPLICATIONS

This application is a continuation of International Application No. PCT/CN2020/100214 filed on Jul. 3, 2020, which claims priority to Chinese Patent Application No. 201910631996.9 tiled on Jul. 12, 2019. The disclosures of the aforementioned applications are hereby incorporated by reference in their entireties.

TECHNICAL FIELD

This application relates to the communication field, and specifically, to a symbol processing method and related apparatus.

BACKGROUND

To mitigate a channel multipath effect, the technique of adding a guard period between symbols is proposed. First, the guard period can be used to eliminate inter-symbol interference (ISI) between adjacent symbols. Second, after a transmit symbol passes through a multi path channel, the guard period converts a linear convolution of the channel and the transmit symbol into a circular convolution of the channel and the transmit symbol, so that the symbol receive end can eliminate the channel multipath effect by using a frequency domain equalization method.

Usually, a cyclic prefix (CP) is used as the inter-symbol guard period. The cyclic prefix is a cyclic structure obtained by copying a segment of data at the back (or referred to as a tail) of a data symbol to the front (or referred to as a header) of the symbol.

To implement flexible multi-user multiplexing, a stable frame structure needs to be maintained. To maintain a stable frame structure, the cyclic prefix length is fixed. In implementation, a network deice configures a same cyclic prefix length for a plurality of users. However, different users have different channel conditions. Therefore, requirements for the cyclic prefix length may also be different. To ensure good performance for different users, a system selects a cyclic prefix whose length is greater than a multipath delay of a long-delay-spread user. However, for a short-delay-spread user, an excessively long cyclic prefix causes unnecessary overheads.

Therefore, it is a problem that in the current technology, the inter-symbol guard period cannot be flexibly configured based on user requirements.

SUMMARY

This application provides a symbol processing method and an apparatus, to flexibly extend a cyclic prefix, and implement flexible configuration of an inter-symbol guard period.

According to a first aspect, a symbol processing method is provided. The method includes: obtaining a plurality of complex-valued symbols; dividing the plurality of complex-valued symbols into a plurality of sets, where each set corresponds to one transmit symbol, and the plurality of sets include a first set corresponding to a first transmit symbol; and mapping a first sequence and a second sequence to the first set, where an end position to which the first sequence is mapped is a position of intercepting a cyclic prefix (CP) in the first transmit symbol, and an end position to which the second sequence is mapped it; an end position of the first transmit symbol.

Based on the foregoing technical solution, by mapping a sequence to a set, that is, mapping a sequence, or in other words, adding a sequence to a set corresponding to a transmit symbol, an original cyclic prefix (CP) can be extended by using a sequence with a flexible length, so that the CP can be flexibly extended. In other words, flexible guard periods of different lengths can be configured for different users by adjusting the length of the CP sequence.

Optionally, the first sequence or the second sequence may be a unique word (UW) sequence, an all-zero (zero tail, ZT) sequence (or referred to as a zero tail sequence), or the like. ZT may be considered as special UW, that is, UW including elements that are all 0.

Optionally, the unique word sequence may be a modulated (including pi/2-binary phase shift keying (BPSK), quadrature phase shift keying (QPSK), 16 quadrature amplitude modulation (QAM), and 64QAM) pseudo-random sequence, or may be a modulated (including pi/2-BPSK, QPSK, 16QAM, 64QAM) information bit sequence, and the unique word sequence may further be a predefined sequence such as a ZC sequence. In other words, a form of the first sequence or the second sequence may be understood as a form of symbols.

With reference to the first aspect, in some possible implementations of the first aspect, the plurality of sets further include a second set corresponding to a second transmit symbol, the first transmit symbol and the second transmit symbol are consecutive in time domain, and the first transmit symbol is located before the second transmit symbol in time domain; and the method further includes: mapping a third sequence and a fourth sequence to the second set, where an end position to which the third sequence is mapped is a position of intercepting a CP in the second transmit symbol; and an end position to which the fourth sequence is mapped is an end position of the second transmit symbol, where the second sequence and the third sequence are the same.

Based on the foregoing technical solution, a symbol component (namely, the second sequence) at the end position of the first transmit symbol and a symbol component (namely, the third sequence) at the end position of the second transmit symbol are the same. Therefore, the length of a symbol component shared between the first transmit symbol and the second transmit symbol can be controlled, so that the inter-symbol guard period is flexibly configured.

In addition, the length of the symbol component shared between the first transmit symbol and the second transmit symbol does not affect the frame structure of the transmit symbol. Therefore, for users with different channel conditions, by configuring the shared symbol component with different lengths, first the inter-symbol guard period can be flexibly configured, and second, (frequency division, spatial division, and time division) multiplexing can also be performed between users configured with different guard periods.

Optionally, the third sequence or the fourth sequence may be a unique word sequence, an all-zero sequence (or referred to as a zero tail sequence), or the like.

Optionally, the first sequence may be used as a guard period between the first transmit symbol and the second transmit symbol, and the second sequence may be used as a guard period between the first transmit symbol and the third transmit symbol. The first transmit symbol and the third transmit symbol are consecutive in time domain, and the first transmit symbol is located after the third transmit symbol.

With reference to the first aspect, in some possible implementations of the first aspect, the method further includes; performing frequency domain weighting or right cyclic shift on the first set to which the first sequence and the second sequence are mapped.

Optionally, the right cyclic shift may also be referred to as a backward cyclic shift, and a direction of the cyclic shift is described in the following embodiment.

The cyclic shift processing is performed on the first set to which the first sequence and the second sequence are mapped, so that the end position of the first sequence corresponds to a position after a second reference point, and the end position of the second sequence corresponds to a position after a first reference point. The first reference point represents an end position of the transmit symbol, and the second reference point represents a position of intercepting a CP in the transmit symbol.

Optionally, frequency domain weighting or right cyclic shift is performed on the second set to which the third sequence and the fourth sequence are mapped.

After the cyclic shift is performed on the first transmit symbol and the second transmit symbol, phases of the first transmit symbol and the second transmit symbol may become continuous. The continuous phase not only improves CP extension performance, for example, improves a multipath resistance effect of the CP (namely, an equivalent guard period), but also reduces an adjacent channel leakage ratio (ACLR) of a waveform, thereby improving performance.

With reference to the first aspect, in some possible implementations of the first aspect, a length of the first sequence and/or the second sequence is greater than a CP length: or a length of the first sequence and/or the second sequence is less than a CP length.

With reference to the first aspect, in some possible implementations of the first aspect, the first sequence is a unique word sequence or an all-zero sequence, and the second sequence is a unique word sequence or an all-zero sequence.

Optionally, the sequences mentioned, in this embodiment of this application, for example, the first sequence, the second sequence, the third sequence, and the fourth sequence, may be UW, ZT, or the like.

With reference to the first aspect, in some possible implementations of the first aspect, the first sequence and the second sequence are different.

Based on the foregoing technical solution, sequences in a same transmit symbol, for example, UWs, may be different. In other words, sequences mapped to a same set may be different. Therefore, this helps to eliminate frequency domain ripples that may be caused by previous UW technology.

With reference to the first aspect, in some possible implementations of the first aspect, when the length of the second sequence is greater than the CP length, a tail of the first sequence and a header of the second sequence overlap, where an element in an overlapping part of the first sequence and an element in an overlapping part of the second sequence are the same.

Optionally, the tail of the first sequence and the header of the second sequence overlap, and elements in the overlapping region, or in other words, elements in the intersection region, are the same.

With reference to the first aspect, in some possible implementations of the first aspect, a time domain vector corresponding to a first subset is the following subvector $x_l[1]$ in a time domain vector $x_l$ corresponding to the first set:

$$x_l[1]=[x_l(M-M_l^1-K), x_l(M-M_l^1-K+1), \ldots, x_l(M-K-1)]^T$$

A time domain vector corresponding to a second subset is the following subvector $x_l[2]$ in a time domain vector $x_{l+1}$ corresponding to the first set:

$$x_l[2]=[x_l(M-M_l^2), x_l(M-M_l^2+1), \ldots, x_l(M-1)]^T$$

The first subset is a subset including the first sequence in the first set, the second subset is a subset including the second sequence in the first set, l represents an index of the first transmit symbol, M represents a dimension of the time domain vector corresponding to the set, $M_l^1$ represents a length of the first sequence, $M_l^2$ represents a length of the second sequence. (M−K−1) represents a time domain index of the second reference point in the time domain vector corresponding to the set, and a value of K is determined based on the CP length.

According to a second aspect, a symbol processing method is provided. The method includes: sending a first transmit symbol, where a first set corresponding to the first transmit symbol includes a mapped first sequence and or a mapped second sequence, and an end position of the first sequence is a position of intercepting a cyclic prefix (CP) in the first transmit symbol, an end position of the second sequence is an end position of the first transmit symbol.

Based on the foregoing technical solution, a guard period used to transmit a symbol includes the cyclic prefix and the mapped (in other words, added) sequence. In other words, by mapping the sequence to the set, an original cyclic prefix can be extended by using a sequence with a flexible length, so that the CP can be flexibly extended. In other words, flexible guard periods of different lengths can be configured for different users by adjusting a length of the sequence.

According to a third aspect, a symbol processing method is provided. The method includes: sending a first transmit symbol and a second transmit symbol, where a first set corresponding to the first transmit symbol includes a mapped first sequence and/or a mapped second sequence, and a second set corresponding to the second transmit symbol includes a mapped third sequence and/or a mapped fourth sequence; an end position of the first sequence is a position of intercepting a cyclic prefix (CP) in the first transmit symbol, an end position of the second sequence is an end position of the first transmit symbol, an end position of the third sequence is a position of intercepting a cyclic prefix (CP) in the second transmit symbol; and an end position of the fourth sequence is an end position of the second transmit symbol, where the second sequence and the third sequence are the same.

Based on the foregoing technical solution, a symbol component (namely, the second sequence) at the end position of the first transmit symbol and a symbol component (namely, the third sequence) at the end position of the second transmit symbol are the same. Therefore, a length of a symbol component shared between the first transmit symbol and the second transmit symbol can be controlled, so that an inter-symbol guard period is flexibly configured.

In addition, the length of the symbol component shared between the first transmit symbol and the second transmit symbol does not affect a frame structure of the transmit symbol. Therefore, for users with different channel conditions, by configuring the shared symbol components with different lengths, first the inter-symbol guard period can be flexibly configured, and second, (frequency division, spatial division, and time division) multiplexing can also be performed between users configured with different guard periods.

According to a fourth aspect, a symbol processing apparatus is provided, and the apparatus is configured to perform the method provided in any one of the first aspect to the third aspect.

Optionally, the apparatus may include a mock e configured to perform the method provided in any one of the first aspect to the fourth aspect.

According to a fifth aspect, a symbol processing apparatus is provided, and the apparatus includes a memory and a processor, The memory is configured to store instructions, the processor is configured to execute the instructions stored in the memory, and execution of the instructions stored in the memory enables the apparatus to perform the method provided in any one of the first aspect to the third aspect.

According to a sixth aspect, a chip is provided, and the chip includes a processing module and a communication interface. The processing module is configured to control the communication interface to communicate with the outside, and the processing module is further configured to implement the method provided in any one of the first aspect to the third aspect.

According to a seventh aspect, a computer-readable storage medium is provided, and the computer-readable storage medium stores a computer program. When the computer program is executed by a communication apparatus, the communication apparatus is enabled to perform the method provided in any one of the first aspect to the third aspect.

According to an eighth aspect, a computer program product including instructions is provided. When the instructions are executed by a computer, the computer is enabled to implement the method provided in any one of the first aspect to the third aspect.

Therefore, in this application, when the CP length is fixed, the inter-symbol guard period can be flexibly configured by using sequences of a flexible length, and the length the guard period can be flexibly configured based on user requirements.

DESCRIPTION OF EMBODIMENTS

The following describes technical solutions of this application with reference to the accompanying drawings.

The technical solutions in the embodiments of this application may be applied to various communication systems, for example, a cellular communication system such as a long term evolution (LTE) and evolution thereof, a future 5th veneration (5G) system, or a new radio (NR) system, a machine-to-machine communication (M2M) system, another future-evolved communication system, and the like.

Compared with a multicarrier waveform such as orthogonal frequency division multiplexing (OFDM), a single carrier waveform such as a discrete Fourier transformation-spread-orthogonal frequency division multiplexing (DFT-s-OFDM) or a single-carrier quadrature amplitude modulation (SC-QAM) has a lower peak to average power ratio (PAPR). Therefore, with a same power amplifier, the single-carrier waveform can provide larger output power and higher power amplification efficiency, thereby improving coverage and reducing power consumption. Therefore, the single-carrier waveform such as the DFT-s-OFDM or the SC-QAM is widely used in various communication systems, for example, an LTE system, a 5G system, or an NR system.

Usually, a cyclic prefix (CP) is used as a guard period between symbols (DFT-s-OFDM symbols) in a DFT-s-OFDM waveform.

Figure 1:
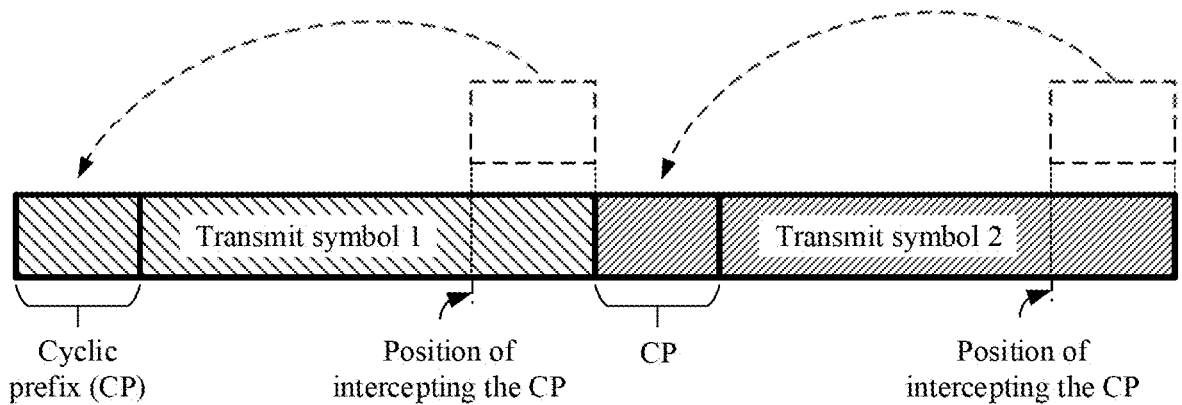
FIG. 1 and FIG. 2 are schematic diagrams of using a cyclic prefix (CP) as an inter-symbol guard period.

FIG. 1 is a schematic diagram of a time domain structure of a cyclic prefix (denoted as a CP below) used as an inter-symbol guard period. In FIG. 1, two transmit symbols are given: a transmit symbol 1 and a transmit symbol 2. A CP of the transmit symbol 1 refers to a cyclic structure obtained by copying, to a position before the transmit symbol 1, a transmit symbol component between a position of intercepting a CP in the transmit symbol 1 and an end position of the transmit symbol. Similarly, a CP of the transmit symbol 2 refers to a cyclic structure obtained by copying, to a position before the transmit symbol 2, a transmit symbol component between a position of intercepting a CP in the transmit symbol 2 and an end position of the transmit symbol 2.

The CP of the transmit symbol 2 is used as a guard period between the transmit symbol 1 and the transmit symbol 2, and the CP of the transmit symbol 1 is used as a guard period between the transmit symbol 1 and a transmit symbol (not shown in FIG. 1) before the transmit symbol 1.

Figure 2:
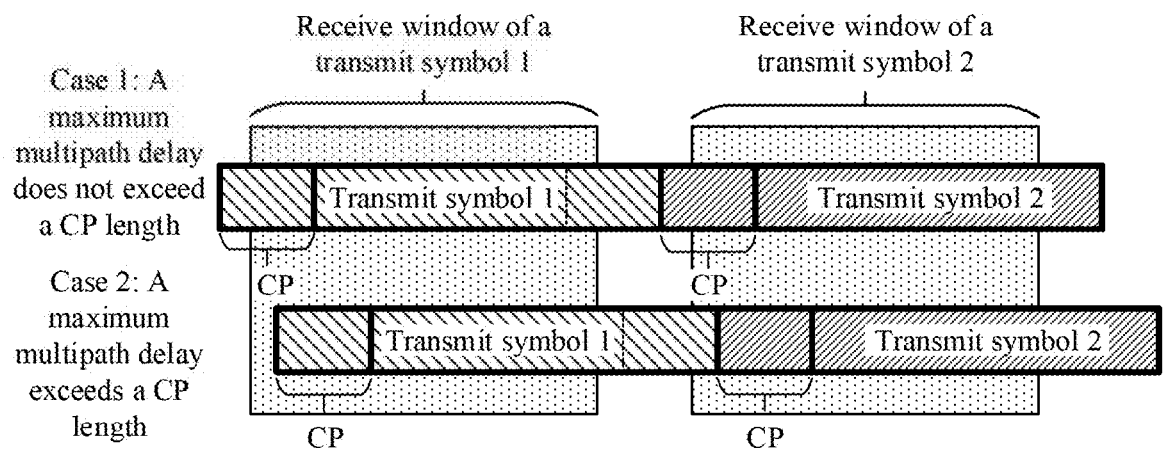

FIG. 2 shows reception of the transmit symbol 1 and the transmit symbol 2 of FIG. 1 that arrive at a receive end after channel transmission (as an example, FIG. 2 shows only a channel maximum multipath delay).

Case 1 indicates that the channel maximum multipath delay does not exceed a CP length. In case 1, because of the protection from the CP, a receive window of each transmit symbol does not include inter-symbol interference (ISI) of another transmit symbol. As shown in FIG. 2, a receive window of the transmit symbol 2 does not include the transmit symbol 1, so that the ISI of the transmit symbol 1 can be avoided; and a receive window of the transmit symbol 1 does not include a transmit symbol (not shown in FIG. 2) before the transmit symbol 1, so that the transmit symbol 1 is not interfered by ISI either. In addition, in the case 1, in the receive window of each transmit symbol, a receive symbol is a circular convolution of the transmit symbol and the channel, so that the receive end can eliminate a channel multipath effect by using a frequency domain equalization method.

Case 2 indicates that the channel maximum multipath delay exceeds a CP length. In case 2, because the channel delay exceeds the CP length, a receive window of each transmit symbol includes another transmit symbol. As shown in FIG. 2, receive window of the transmit symbol 2 includes a segment of transmit symbol component of the transmit symbol 1, so that the transmit symbol 2 is interfered by ISI of the transmit symbol 1; and a receive window of the transmit symbol 1 may also include a transmit symbol (not shown in FIG. 2) before the transmit symbol 1, so that the transmit symbol 1 is also interfered by ISI. In addition, in the case 2, in the receive window of each transmit symbol, a receive symbol is no longer a circular convolution of the transmit symbol and the channel, and this is unfavorable for eliminating a channel multipath effect by the receive end.

The transmit symbol mentioned in the foregoing descriptions indicates a symbol sent by a transmit end, and the receive symbol indicates a symbol received by the receive end.

It can be learned from FIG. 2 that a CP length required by a channel condition in the case 2 is greater than a CP length required by a channel condition in the case 1. In other words, different channel conditions require different CP lengths.

It can be learned from FIG. 1 and FIG. 2 that the CP length affects a frame structure. Due to reasons such as transceiver complexity and out-of-band interference, (frequency division, space division, and time division) multiplexing between users with different CP lengths has less flexibility. During implementation to perform flexible multi-user multiplexing, a network device usually configures a same CP length for different users. However, as shown in FIG. 2, user equipment with different channel conditions may require different CP lengths. In a current technology, to overcome the problem shown in FIG. 2, that is, to ensure performance of all users having different channel conditions, a system selects a CP length that is greater than the channel delay of a large-delay user as the CP length fir all users. However, for a small-delay user, an excessively long CP length causes unnecessary signaling overhead.

It can be learned from the above that, in the current technology, the inter-symbol guard period cannot be flexibly configured based on user requirements.

This application provides a symbol processing method and an apparatus, so that when the CP length is fixed, an inter-symbol guard period can still be flexibly configured.

Figure 3:
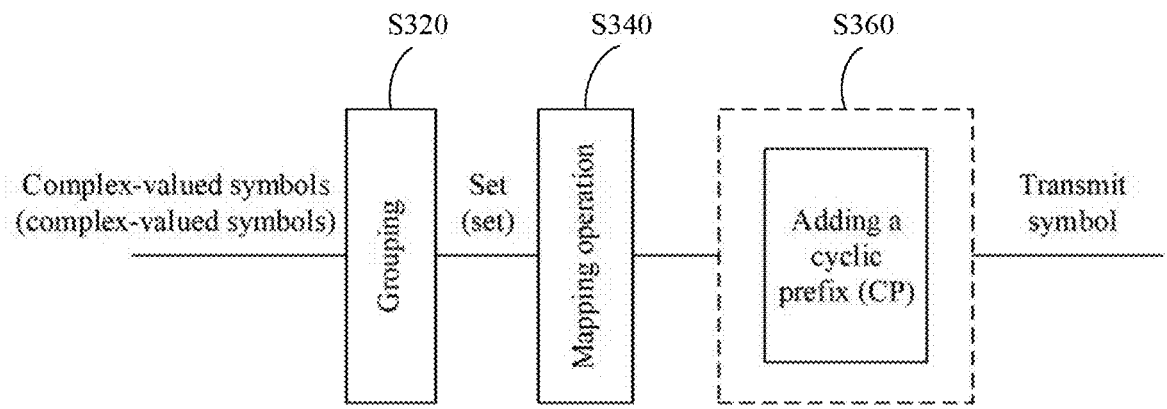
FIG. 3 is a basic flowchart of a symbol processing method according to an embodiment of this application.

FIG. 3 is a schematic flowchart of a symbol processing method according to an embodiment of this application. The method may include the following steps S320, S340, and S360.

S320: Group a plurality of complex-valued symbols (complex-valued symbols) to obtain a plurality of sets (sets), where each set corresponds to one transmit symbol.

In other words, the plurality of complex-valued symbols is divided into (be divided into) a plurality of sets, and each set corresponds to one transmit symbol.

The plurality of complex-valued symbols may include a modulated symbol obtained by modulating an encoded bit stream.

A modulation scheme for modulating the encoded bit stream may include pi/2-binary phase shift keying (BPSK), quadrature phase shift keying (QPSK), 16 quadrature amplitude modulation (QAM), 64QAM, 256QAM, phase shift keying (PSK), amplitude phase shift keying (APSK), non-uniform QAM, and the like.

Optionally, the plurality of complex-valued symbols may further include a reference signal sampling point. For example, the reference signal sampling point may include a phase tracking reference signal (PTRS) sampling point and the like.

Each set may include several complex-valued symbols. For example, each set may be considered as a multidimensional time domain vector, and a complex-valued symbol in the set may be considered as an element in the time domain vector.

That, each set corresponds to one transmit symbol means that each finally generated transmit symbol is generated based on a corresponding set.

The transmit symbol in this embodiment of this application may be at uplink waveform symbol and/or a downlink waveform symbol in a communication system.

For example, the transmit symbol may be a OFT-s-OFDM symbol, that is, each set corresponds to one DFT-s-OFDM symbol. For another example, the transmit symbol may be an SC-QAM symbol, that is, each set corresponds to one SC-QAM symbol.

It should be understood that the transmit symbol is merely a name, and does not limit the protection scope of this embodiment of this application. The transmit symbol may alternatively have another form, This is not limited in this embodiment of this application.

S340: Perform a mapping operation on the plurality of sets obtained in step S320.

In other words, a mapping operation is performed on each set obtained in step S320. In other words, a sequence adding operation is performed on each set obtained in step S320. The mapping operation is used for description in the following specification.

For generality, a first set is used as an example for description. The first set belongs to any one of the plurality of sets, and the mapping operation may be performed on any one of the plurality of sets.

A mapping operation on the first set includes: mapping a first sequence and a second sequence to the first set, where an end position to which the first sequence is mapped is a position of intercepting a CP in a first transmit symbol, and an end position to which the second sequence is mapped is an end position of the first transmit symbol.

Optionally, a sequence mentioned in this embodiment of this application, for example, the first sequence, the second sequence, a third sequence, or a fourth sequence, may be a unique word (UW) sequence, an all-zero (zero tail, ZT) sequence (or referred to as a zero tail sequence), or the like. ZT may be considered as special UW, that is, UW including elements that are all 0.

Optionally, the unique word sequence may be a modulated (including pi/2-binary phase shift keying (BPSK), quadrature phase shift keying (quadrature phase shift keying, QPSK), 16 quadrature amplitude modulation (quadrature amplitude modulation, QAM), and 64QAM) pseudo-random sequence, or may be a modulated (including pi/2-BPSK, QPSK, 16QAM, 64QAM) information bit sequence, and the unique word sequence may further be a predefined sequence such as a ZC sequence.

Optionally, unless otherwise specified, the sequence mentioned in this embodiment of this application, for example, the first sequence, the second sequence, the third sequence, or the fourth sequence, is in a form of symbols. Mapping a sequence to a set may be understood as adding a plurality of symbols to several complex-valued symbols in the set (that is, mapping the sequence).

Therefore, in this embodiment of this application, by mapping the sequence to the set, an original CP can be extended by using a sequence with a flexible length, such as UW or ZT, so that the CP can be flexibly extended, and flexible guard periods of different lengths can be configured for different users by adjusting the length of the sequence.

The symbol processing method provided in this application may be implemented by a transmit end, for example, may be implemented by a transmitter or a circuit used to implement functions of a transmitter. The transmit end may be a terminal device, or may be a network device.

It should be noted that the length mentioned in this specification, for example, a CP length, a length of a sequence, and a length of a symbol component, refer to a time length, For example, a unit of the time length mentioned in this specification is $T_c=1(4096 \cdot 480 \cdot 10^3)$ seconds. For another example, the time length may alternatively be represented by a quantity of time domain sampling points.

Figure 4:
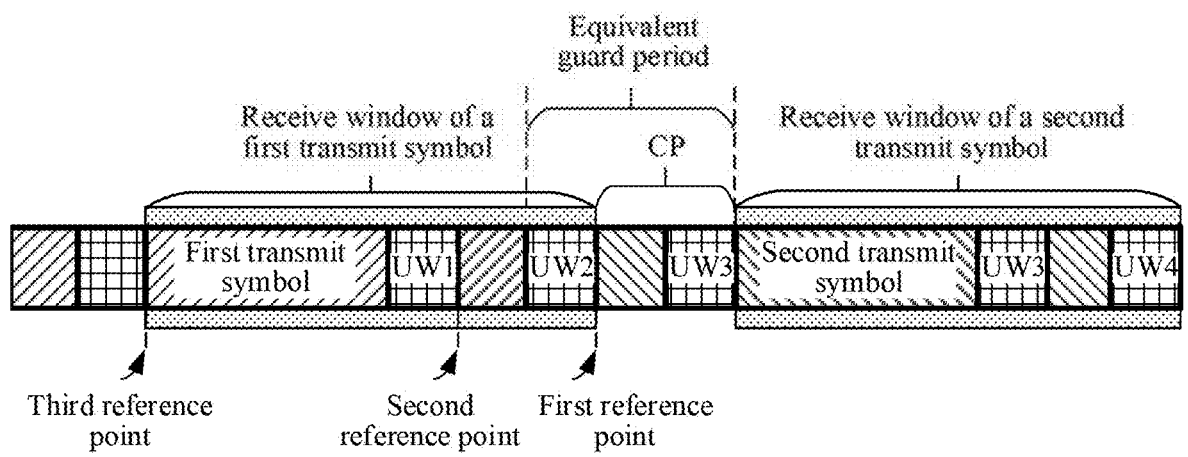
FIG. 4 is a schematic diagram of a time domain structure of transmit symbols according to an embodiment of this application.

It should be further noted that, for ease of understanding and description rather than limitation, in this specification, three reference points are defined for the transmit symbol: a first reference point, a second reference point, and a third reference point (which will be mentioned in the following embodiments), as shown in FIG. 4. The first reference point represents an end position of the transmit symbol, the second reference point represents a position of intercepting a CP in the transmit symbol, and the third reference point represents a start position of the transmit symbol. The length of the distance between the second reference point and the end position of the transmit symbol is equal to the CP length. The start position of the transmit symbol refers to the start position of the transmit symbol itself, not a start position of the CP of the transmit symbol, or it may be understood from another perspective as that the start position of the transmit symbol refers to an end position of the CP of the transmit symbol.

It should be further noted that all positions mentioned in this specification refer to time domain positions.

Optionally, the plurality of sets further includes a second set corresponding to a second transmit symbol, the first transmit symbol and the second transmit symbol are consecutive in time domain, and the first transmit symbol is located before the second transmit symbol. The third sequence and the fourth sequence are mapped to the second set, and an end position to which the third sequence is mapped is a position of intercepting a CP in the second transmit symbol (namely, the second reference point). An end position to which the fourth sequence is mapped is an end position of the second set (namely, the first reference point). The second sequence and the third sequence are the same.

For example, in this embodiment of this application, an example in which the sequence is UW is used for description. For brevity, the first sequence is denoted as UW1, the second sequence is denoted as UW2, the third sequence is denoted as UW3, and the fourth sequence is denoted as UW4.

For example, a schematic diagram of a time domain structure of the first transmit symbol and the second transmit symbol is shown in FIG. 4. A symbol component UW2 of the first transmit symbol and a symbol component UW3 of the second transmit symbol are the same, an end position of the symbol component UW2 of the first transmit symbol is the first reference point, and an end position of the symbol component UW3 of the second transmit symbol is the second reference point.

That the symbol component UW2 of the first transmit symbol and the symbol component UW3 of the second transmit symbol are the same includes: the content included in the symbol component UW2 and the symbol component UW3 are the same, and the time lengths of the symbol component UW2 and the symbol component UW3 are the same. That the content included in the symbol component UW2 and the symbol component UW3 are the same may be understood as that: before the symbol component is generated, complex-valued symbols respectively corresponding to the symbol component UW2 and the symbol component UW3 are the same.

It should be noted that, in the foregoing description with reference to FIG. 4, it is mentioned that "a symbol component UW2 of the first transmit symbol and a symbol component UW3 of the second transmit symbol are the same". The "same" herein is not necessarily the same in an absolute sense, and may also represent approximately the same. It should be understood that, due to a filter smearing effect, there may be a slight deviation between the symbol component UW2 of the first transmit symbol and the symbol component UW3 of the second transmit symbol.

Figure 5:
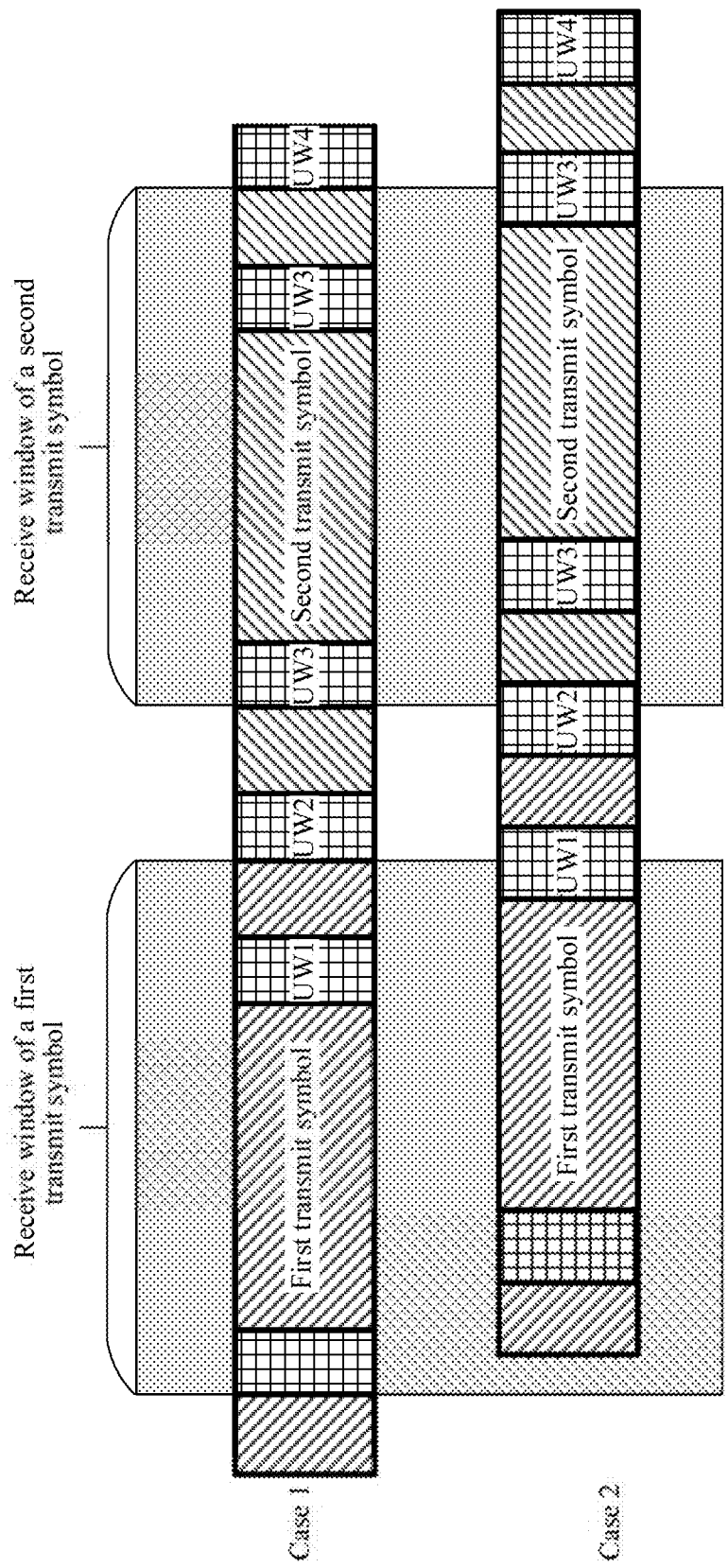
FIG. 5 is another schematic diagram of a time domain structure of transmit symbols according to an embodiment of this application.

FIG. 5 shows reception of the first transmit symbol and the second transmit symbol shown in FIG. 4 (after channel transmission) at a receive end.

Case 1 indicates that a channel maximum multipath delay does not exceed a CP length. In the case 1, because of the protection of the CP, a receive window of each transmit symbol does not include ISI of another transmit symbol. As shown in FIG. 5, a receiving window of the second transmit symbol does not include a component of the first transmit symbol, so that the ISI of the first transmit symbol can be avoided.

Case 2 indicates that a channel maximum multipath delay exceeds a CP length. In case 2, because the channel delay exceeds the CP length, a receive window of each transmit symbol may include another transmit symbol. As shown in FIG. 5, a sequence (such as UW) added to the first transmit symbol may be used as an additional guard period. The receiving window of the second transmit symbol includes a symbol component of the first transmit symbol. However, because the symbol component is UW2, and is the same as a symbol component composing the second transmit symbol, to be specific, the symbol component UW2 of the first transmit symbol is the same as a symbol component UW3 of the second transmit symbol. That the symbol component UW2 of the first transmit symbol enters the receiving window of the second transmit symbol is equivalent to that the symbol component UW3 of the second transmit symbol enters the receive window of the second transmit symbol. In addition, because the symbol component UW3 is continuous with a symbol component used as the CP in the second transmit symbol, based on the principle that UW3 of the second transmit symbol does not cause ISI to the second transmit symbol, the symbol component UW2 of the first transmit symbol entering the receive window of the second transmit symbol does not cause the ISI to the second transmit symbol either.

It can be learned from FIG. 4 and FIG. 5 that, even if the CP length is fixed, an original CP can be extended by using a UW with a flexible length. In this way, the inter-symbol guard period can be flexibly configured, and a sum of the length of the symbol component and the CP length can be greater than the channel delay. Therefore, a channel multipath effect can be resisted.

For better understanding rather than limitation, in the examples of FIG. 4 and FIG. 5, the symbol component UW2 of the first transmit symbol may be used as a CP of the second transmit symbol, so that an equivalent guard period (or may also be referred to as a virtual guard period), that is, an equivalent guard period between the first transmit symbol and the second transmit symbol, for example, an equivalent guard period shown in FIG. 4, greater than the original CP is obtained.

In this application, for the first transmit symbol and the second transmit symbol that are continuous in time domain, a symbol component (namely, the second sequence, such as UW2) that is in the first transmit symbol and whose end position is the first symbol component, and a symbol component (namely, the third sequence, such as UW3) that is in the second transmit symbol and whose end position is the second symbol component, are the same. Therefore, a length of a symbol component shared between the first transmit symbol and the second transmit symbol can be controlled, so that an inter-symbol guard period is flexibly configured by using a sequence with a flexible length.

In addition, it should be understood that the length of the symbol component shared between the first transmit symbol and the second transmit symbol does not affect a frame structure of the transmit symbol. Therefore, for users with different channel conditions, by configuring the shared symbol components with different lengths, first the inter-symbol guard period can be flexibly configured, and second, (frequency division, spatial division, and time division) multiplexing can also be performed between users configured with different guard periods.

Therefore, in this application, when the CP length is fixed, a length of the guard period can be flexibly configured based on a user requirement by using a sequence (such as a UW) with a flexible length, to implement flexible configuration of the inter-symbol guard period.

Optionally, as shown in FIG. 3, the method may further include S360.

S360: Process the Plurality of sets obtained in step S340 to obtain a plurality of transmit symbols, where the processing includes adding a CP.

Alternatively, in step S360, the CP is added based on the set that is after the mapping operation and that is obtained in step S340, and then other operations are performed to obtain the transmit symbol. The other operations herein include, but are not limited to: fast Fourier transform, Cartier Mapping, sampling, filtering, and the like.

It should be understood that, because a part of the sequences added to the two sets corresponding to two consecutive transmit symbols in time domain are the same, for example, the second sequence and the third sequence are the same, there are some same complex-valued symbols between the two sets corresponding to the two transmit symbols. Therefore, to some extent, a time domain structure of two transmit symbols corresponding to the two sets may be implemented as shown in FIG. 4.

Therefore, in this embodiment of this application, the mapping operation is performed on two sets corresponding to two transmit symbols that are consecutive in time domain, so that the two sets have a same complex-valued symbol. This is favorable for generating a transmit symbol having the time domain structure shown in FIG. 4. Therefore, on the premise that the CP length is fixed, the inter-symbol guard period can be flexibly configured by using a sequence with a flexible length.

For ease of differentiation rather than limitation, the following convention is made for naming a signal in this specification: A signal to be grouped (or categorized) into a set is referred to as a complex-valued symbol; a signal obtained by grouping (or dividing) complex-valued symbols is referred to as a set; a set consisting of a part of the complex-valued symbols in the set is referred to as a subset; and a signal sent by a transmit end is referred to as a transmit symbol.

It should be understood that these names are merely intended for ease of understanding and differentiation, rather than limitation. For example, in a future technology evolution process, signals obtained at different stages of a symbol generation procedure may have other names.

The transmit symbol in this embodiment of this application may be a single-carrier waveform symbol. For example, the transmit symbol is a DFT-s-OFDM symbol. The DFT-s-OFDM symbol represents a single-carrier symbol whose waveform is a DFT-s-OFDM waveform. For another example, the transmit symbol is an SC-QAM symbol. The SC-QAM symbol represents a single-carrier symbol whose waveform is an SC-QAM waveform.

In the following specification, a scenario in which this application is applicable to a wireless communication system using a DFT-s-OFDM waveform is denoted as an application scenario 1, and a scenario in which this application is applicable to a wireless communication system using an SC-QAM waveform is denoted as an application scenario 2.

Figure 6:
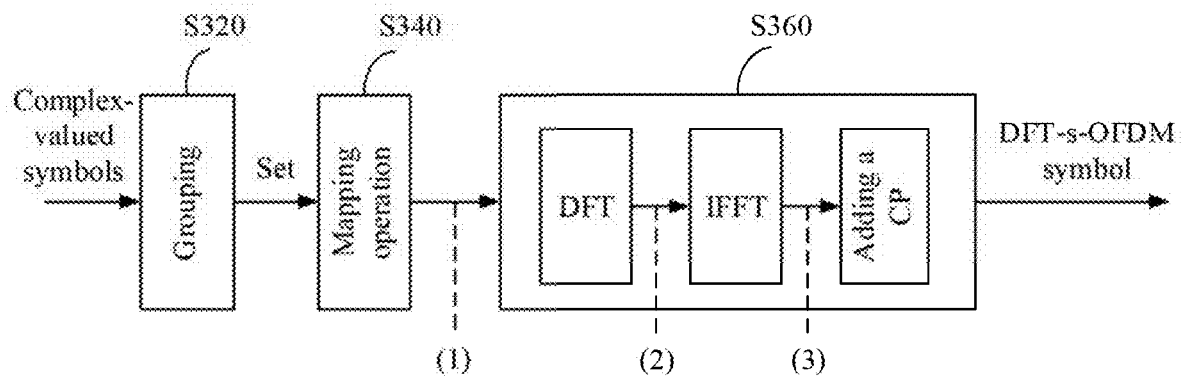
FIG. 6 and FIG. 7 are basic flowcharts of a symbol processing method applicable to an embodiment of this application.

Optionally, an application scenario of this application is the application scenario 1, to be specific, the transmit symbol is a DFT-s-OFDM symbol. As Shown in FIG. 6, step S360 not only includes an operation of adding a CP, but also includes operations of discrete Fourier transform (OFT) and inverse fast Fourier transform (IFFT).

For example, in step S360, the transmitter performs M-point OFT transform on the set obtained after the mapping operation; maps M-point frequency domain elements obtained after the DFT transform to M consecutive subcarriers (not shown in FIG. 6); performs IFFT transform on a frequency domain signal after subcarrier mapping; and adds the CP to the signal obtained after the IFFT, to finally obtain the OFT-s-OFDM symbol. The OFT may also be referred to as frequency domain precoding.

Optionally, step S360 further includes a frequency domain spectrum shaping (FDSS) operation.

For example, in step S360, the transmitter performs M-point DFT transform on the set obtained after the mapping operation; performs cyclic extension and frequency-domain filtering (namely, the FDSS operation) on M-point frequency domain elements obtained after the OFT transform; maps frequency domain elements obtained after the FDSS operation to M1 (M1≥M) consecutive subcarriers; performs IFFT transform on a frequency domain signal after subcarrier mapping, and adds the CP to the signal obtained after the IFFT; to finally obtain the DFT-s-OFDM symbol.

It should be understood that, in the application scenario 1, the mapping operation on the set is performed before the OFF.

Figure 7:
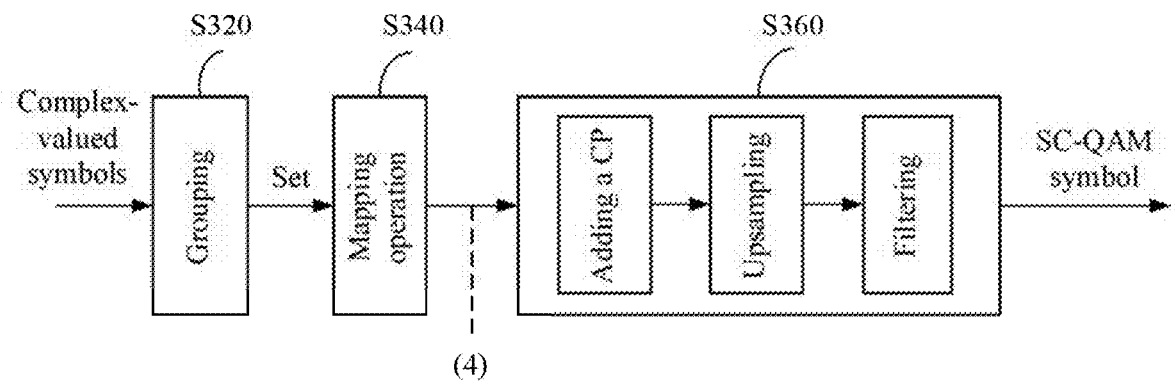

Optionally, an application scenario of this application is the application scenario 2, to be specific, the transmit symbol is an SC-QAM symbol. As shown in FIG. 7, step S360 not only includes an operation of adding a CP, but also includes upsampling and filtering.

For example, in step S360, the transmitter adds the CP to a set obtained after the mapping operation to obtain a signal, and then performs upsampling and filtering on the signal obtained after the CP is added, to finally obtain the SC-QAM symbol.

It should be understood that, in the application scenario 2, the mapping operation on the set is performed before the CP is added.

Therefore, in this embodiment of this application, the mapping operation is performed on two sets corresponding to two transmit symbols that are consecutive in time domain, so that the two sets have a same complex-valued symbol. This is favorable for generating a transmit symbol having the time domain structure shown in FIG. 4. Therefore, on the premise that the CP length is fixed, the inter-symbol guard period can be flexibly configured by using a sequence (such as a UW) with a flexible length.

For ease of understanding and description of the mapping operation on the set, the following first describes an association relationship between the set and the transmit symbol.

For ease of description rather than limitation, three reference points are defined for the transmit symbol: the first reference point, the second reference point, and the third reference point, as shown in FIG. 4. The first reference point represents the end position of the transmit symbol, the second reference point represents the position of intercepting the CP in the transmit symbol, and the third reference point represents the start position of the transmit symbol. The length of the distance between the second reference point and the end position of the transmit symbol is equal to the CP length.

The following separately uses the application scenario 1 and the application scenario 2 as examples for description.

(1) Application scenario 1: The transmit symbol is a DFT-s-OFDM symbol, In the application scenario 1, a symbol processing procedure is shown in FIG. 6.

It is assumed (denoted as an assumption 1) that a quantity of points on which the transmit end performs DFT is M, a dimension of a time domain vector on which the DFT transform is to be performed should be M. The time domain vector ma be denoted as:

$$x_I=[x_I(0),x_I(1),\ldots,x_I(M-1)]^T$$

$x_I$ represents the time domain vector, and T represents transposition.

The time domain vector $x_I$ includes M elements, and time domain indexes of the first element to the last element are respectively 0, 1, . . . , and M−1.

It is assumed (denoted as an assumption 2) that a quantity of points on which the transmit end performs DFT is M (consistent with the assumption 1), a size at which the transmit end performs IFFT is N, and a quantity of sampling points of the CP is P. In this case, a quantity K of points that may be equivalent to the length occupied by the CP before the DFT is:

$$K=P/N*M.$$

If P cannot be exactly divided by N, K is a non-integer. It this case, the calculation result of K needs to be rounded, that is, $K=\lfloor P/N \cdot M \rfloor$ indicates rounding $\lfloor P/N \cdot M \rfloor$ down. It should be understood that a rounding manner herein may alternatively be rounding up, rounding off, or the like.

It should be understood that the quantity P of the sampling points of the CP may be obtained based on the CP length.

Based on the foregoing assumptions, for a first reference point of the DFT-s-OFDM symbol, a time domain index of the lust reference point in the time domain vector $x_I$ is M−1; for a second reference point of the DFT-s-OFDM symbol, a time domain index of the second reference point in the time domain vector $x_I$ is M−K−1; and for a third reference point of the DFT-s-OFDM symbol, a time domain index of the third reference point, in the time domain vector $x_I$ is 0.

(2) Application scenario 2: The transmit symbol is an SC-QAM symbol. As shown in FIG. 7, in a process of generating the SC-QAM symbol, DFT and IFFT are not included before the CP is added, and upsampling and filtering are performed after the CP is added. Therefore, a quantity of points equivalent to a CP length in the time domain vector can be directly obtained based on the CP length. Therefore, the transmitter can directly obtain the equivalent CP length value K1. The equivalent length value K1 may be obtained based on the CP length.

It is assumed that a time domain vector in which the CP is not added is the M-dimensional time domain vector $x_I$ described in the application scenario 1. It is assumed that the equivalent CP length value is K1, for a first reference point of the SC-QAM symbol, a time domain index of the first reference point in the time domain vector $x_I$ is M−1; for a second reference point of the SC-QAM symbol, a time domain index of the second reference point in the time domain vector $x_I$ is M−K−1; and for a third reference point of the SC-QAM symbol, a time domain index of the third reference point in the time domain vector $x_I$ is 0.

It is described above that the set may be viewed as a multi-dimensional time domain vector. The time domain vector $x_I$ in the example in the foregoing specification may represent the time domain vector corresponding to the set. The elements in the time domain vector $x_I$ correspond to the complex-valued symbols in the set. The time domain indexes of the elements in the time domain vector $x_I$ correspond to the positions of the complex-valued symbols in the set.

The example in the foregoing specification shows that the time domain indexes of the elements in the time domain vector $x_I$ and the time domain positions (for example, the first reference point, the second reference point, and the third reference point) of the transmit symbols corresponding to the time domain vector $x_I$ have correspondences. Therefore, the positions of complex-valued symbols in the set also correspond with the positions of transmit symbols corresponding to the set.

Figure 8:
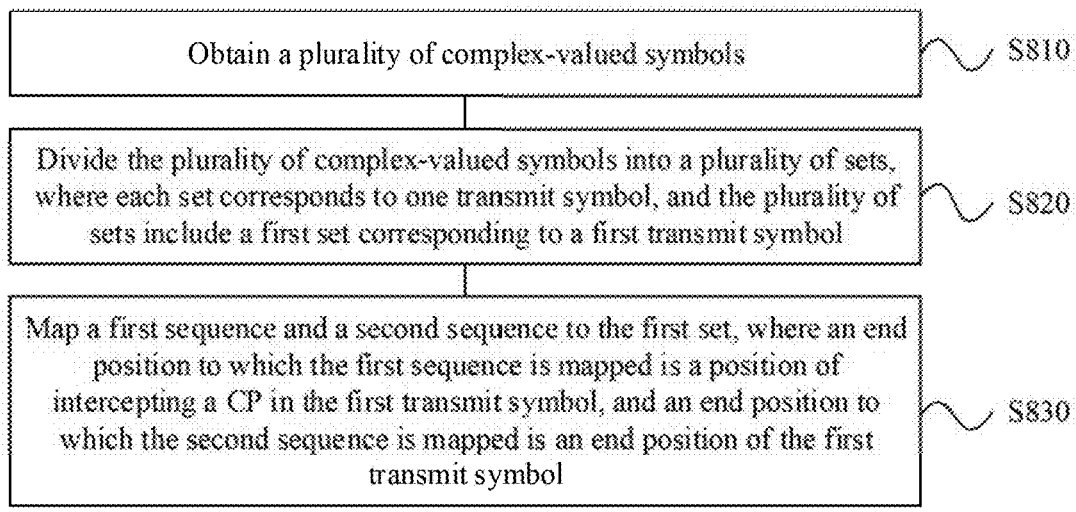
FIG. 8 is a schematic flowchart of a symbol processing method according to an embodiment of this application.

FIG. 8 is a schematic flowchart of a symbol processing method according to another embodiment of this application. The method may include the following step S810 to step S830.

S810: Obtain a plurality of complex-valued symbols.

The plurality of complex-valued symbols may include a modulated symbol obtained by modulating an encoded bit stream.

Optionally, the plurality of complex-valued symbols may further include a reference signal sampling point. For example, the reference signal sampling point may include a PTRS sampling point.

S820: Divide the plurality of complex-valued symbols into a plurality of sets, where each set corresponds to one transmit symbol, and the plurality of sets include a first set corresponding to a first transmit symbol.

Each set may include several complex-valued symbols. For example, each set may be considered as a multidimensional time domain vector, and a complex-valued symbol in the set may be considered as an, element in the time domain vector.

Each set corresponds to one transmit symbol. For example, each set corresponds to a DFT-s-OFDM symbol or an SC-QAM symbol.

Step S820 may correspond to step S320 shown in FIG. 3, FIG. 6, and FIG. 7.

Optionally, the plurality of sets further include a second set corresponding to a second transmit symbol, the first transmit symbol and the second transmit symbol are consecutive in time domain, and the first transmit symbol is located before the second transmit symbol.

S830: Map a first sequence and a second sequence to the first set, where an end position to which the first sequence is mapped is a position of intercepting a cyclic prefix (CP) in the first transmit symbol, and an end position to which the second sequence is mapped is an end position of the first set.

In this specification, a subset including the first sequence in the first set is referred to as a first subset, and a subset including the second sequence in the first set is referred to as a second subset.

In step S830, the mapping operation enables the first set to include the first subset and the second subset. It may be understood as that a sequence with a flexible length is used to implement flexible configuration of an inter-symbol guard period.

For example, a time domain vector corresponding to the first subset is the following subvector $x_l[1]$ in a time domain vector $x_l$ corresponding to the first set:

$$x_l[1]=[x_l(M-M_l^1-K), x_l(M-M_l^1-K+1), \ldots, x_l(M-K-1)]^T$$

A time domain vector corresponding to the second subset is the following subvector $x_l[2]$ in a time domain vector $x_{l+1}$ corresponding to the first set:

$$x_l[2]=[x_l(M-M_l^2), x_l(M-M_l^2+1), \ldots, x_l(M-1)]^T$$

l represents an index of the first transmit symbol, M represents a dimension of he time domain vector corresponding to the set, $M_l^1$ represents a length of the first sequence, $M_l^2$ represents a length of the second sequence, (M−K−1) represents a time domain index of the second reference point in the time domain vector corresponding to the set, and a value of K is determined based on the CP length.

It should be understood that, in the application scenario 1, K in this example is obtained through calculation K=P/N*M (refer to the foregoing specification). In the application scenario 2, K in this example is equal to an equivalent CP length value K1.

It should be understood that, in this example, the elements included in a subvector $x_l[1]$ in the time domain vector $x_l$ corresponding to the lust set and the elements included in the first subset in the first set are the same, and the elements included in the subvector $x_l[2]$ in the time domain vector $x_l$ corresponding to the first set and the elements included in the second subset in the first set are the same.

Figure 9:
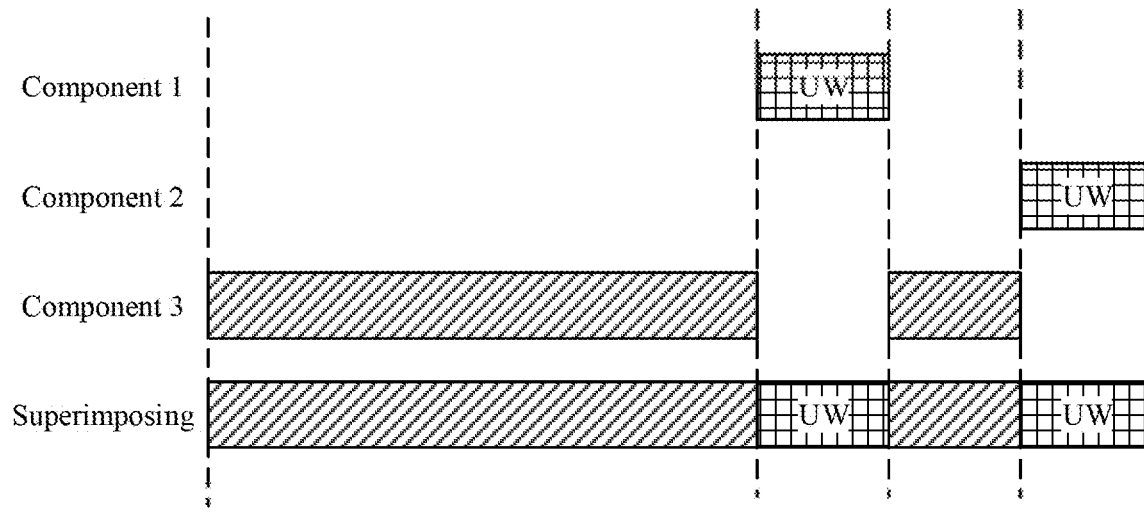
FIG. 9 is a schematic diagram of sequence mapping applicable to an embodiment of this application.

For example, FIG. 9 is a schematic diagram of mapping a sequence to a set. For example, a first set is used as an example. In FIG. 9, a component 1 is a first sequence (for example, UW1), a component 2 is a second sequence (for example, UW2), and a component 3 is a modulated symbol set (that is, the first set before a sequence is mapped). It can be learned that the modulated symbol set occupies a position other than positions occupied by the first sequence and the second sequence. For another example, a second set is used as an example. In FIG. 9, a component 1 is a third sequence (for example, UW3), a component 2 is a fourth sequence (for example, UW4), and a component 3 is a modulated symbol set (that is, the second set before a sequence is mapped). It can be learned that the modulated symbol set occupies a position other than positions occupied by the third sequence and the fourth sequence.

Step S830 may correspond to step S340 shown in FIG. 3, FIG. 6, and FIG. 7.

It should be understood that, in the application scenario 1, step S830 is performed before the DFT; in the application scenario 2, step S830 is performed before the CP is added.

It should be further understood that the first set is any one of a plurality of sets. In other words, the mapping operation may be performed on any one of the plurality of sets. In other words, step S830 may be performed for each of the plurality of sets.

Optionally, the plurality of sets further include a second set corresponding to a second transmit symbol, the first transmit symbol and the second transmit symbol are consecutive in time domain, and the first transmit symbol is located before the second transmit symbol. The third sequence and the fourth sequence are mapped to the second set, the end position to which the third sequence is mapped is a position of intercepting a CP in the second transmit symbol, and the end position to which the fourth sequence is mapped is the end position of the second set. The second sequence and the third sequence are the same.

In some cases, for example, a case in which a channel maximum multipath delay exceeds a CP length (namely, the foregoing case 2). The receiving window of the second transmit symbol includes a symbol component of the first transmit symbol. However, because the symbol component is the second sequence, the symbol component is the same as a symbol component composing the second transmit symbol. To be specific, the symbol component of the first transmit symbol, namely, the second sequence, is the same as a symbol component of the second transmit symbol, namely, the third sequence. Therefore, that the symbol component of the first transmit symbol, namely, the second sequence, enters the receiving window of the second transmit symbol is equivalent to that the symbol component of the second transmit symbol, namely, the third sequence, enters the receive window of the second transmit symbol, Therefore, the symbol component of the first transmit symbol, namely, the second sequence, that enters the receiving window of the second transmit symbol does not causes ISI to the second transmit symbol.

Figure 10:
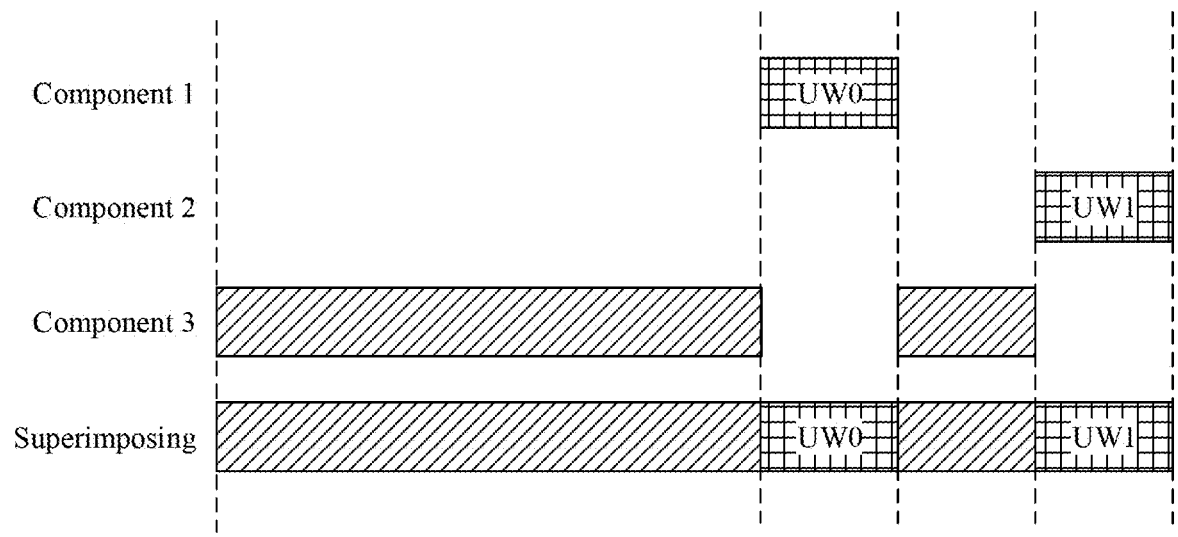
FIG. 10(1) and FIG. 10(2) are another schematic diagram of sequence mapping applicable to an embodiment of this application.
Figure 10:
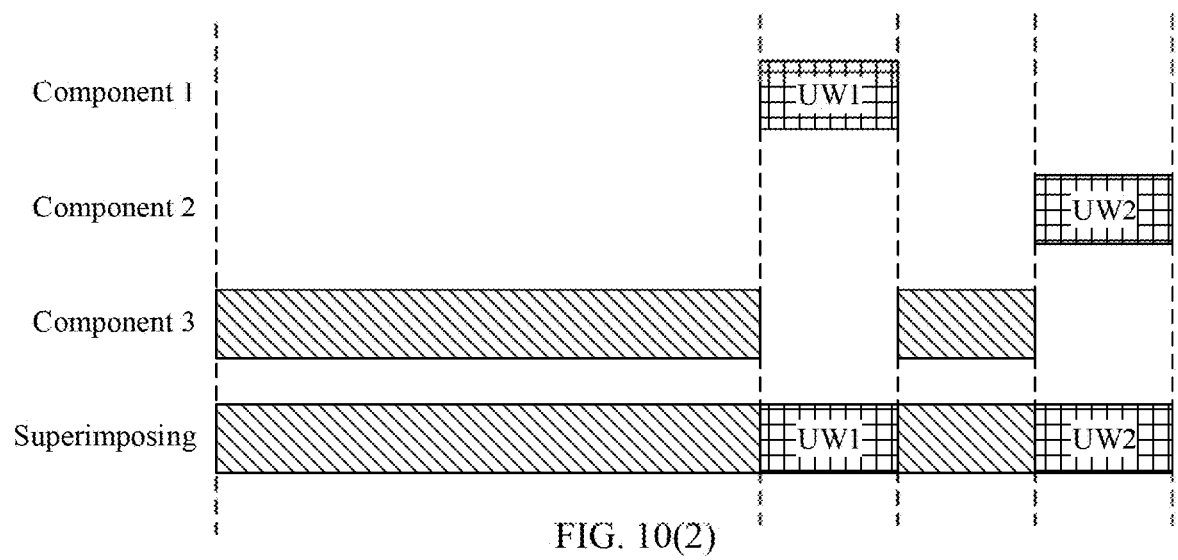

For example, a first set and a second set are used as an example FIG. 10 is another schematic diagram of mapping a sequence to a set. The first set shown in FIG. 10(1) is used as an example. In FIG. 10(1), a component 1 is UW0 (that is, an example of a first sequence), a component 2 is UW1

(that is, an example of a second sequence), and a component 3 is a modulated symbol set (that is, the first set before a sequence is mapped). It can be learned that the modulated symbol set occupies a position other than positions occupied by UW0 and UW1. For another example, the second set shown in FIG. 10(2) is used as an example. In FIG. 10(2), a component 1 is UW1 (that is, an example of a third sequence), a component 2 is UW2 (that is, an example of a fourth sequence), and a component 3 is a modulated symbol set (that is, the second set before a sequence is mapped). It can be learned that the mode ted symbol set occupies a position other than positions occupied by UW1 and UW2.

It can be learned from FIG. 10 that the second sequence snapped to th first set and the third sequence mapped to the second set are the same, that is, UW1 in FIG. 10(1) and UW1 in FIG. 10(2) are the same. In this way, the symbol component of the first transmit symbol, namely, the second sequence, that enters the receive window of the second transmit symbol does not cause ISI to the second transmit symbol, so that the cyclic convolution characteristic at the receive end can be ensured.

Optionally, two sequences mapped to a same set may be the same or may be different. For example, the first sequence and the second sequence may be the same or may be different. For another example, the third sequence and the fourth sequence may be the same or may be different.

As shown in FIG. 10(1), UW0 and UW1 may be different; as shown in FIG. 10(2), UW1 and UW2 may be different. This helps eliminate frequency domain ripples that may be caused by an original UW technology.

Optionally, frequency domain weighting and/or right cyclic shift are performed on the first set to which the first sequence and the second sequence are mapped.

In other words, a frequency domain weighting processing and/or a cyclic shift processing are performed on a set to which a sequence is mapped.

It should be understood that if a cyclic shift processing is performed on the set, it indicates that signal processing is performed on a time domain signal corresponding to the se a frequency domain weighting processing is performed on the set, it indicates that frequency domain weighting is performed on a frequency domain signal corresponding to the set.

The following mainly describes cyclic shift processing.

(1) Cyclic Shift Mode

The cyclic shift processing is performed on the first set to which the first sequence and the second sequence are mapped, so that the end position of the first sequence corresponds to a position after a second reference point, and the end position of the second sequence corresponds to a position after a first reference point.

Figure 11:
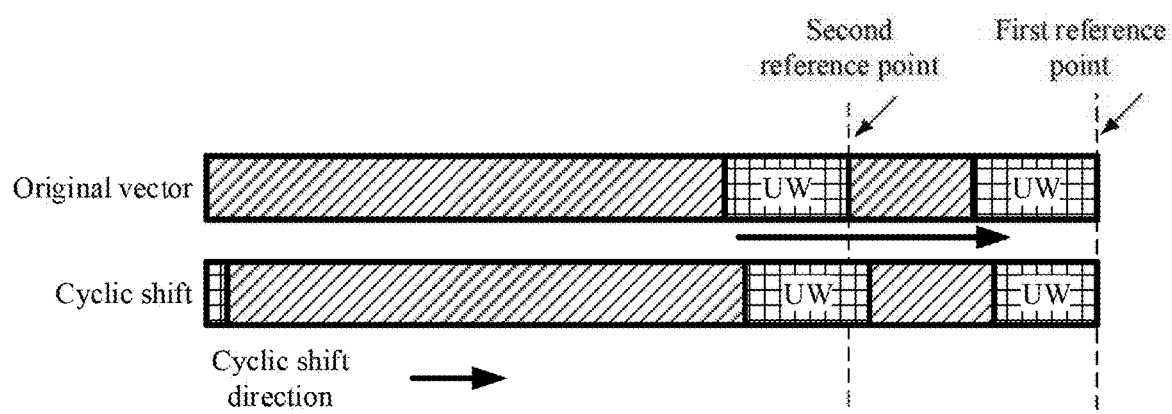
FIG. 11 is a schematic diagram of cyclic shift applicable to an embodiment of this application.

FIG. 11 is a schematic diagram of cyclic shift. An example in which the sequence is UW is used. Two UW segments are added to the set (that is, the two UW segments are mapped to the set), where an end position of a first UW segment is a position of a second reference point, and an end position of a second UW segment is a position of a first reference point. After the first UW segment and the second UW segment are added to the set, time domain cyclic shift is performed. A cyclic shift direction is a rightward direction or a backward direction, for example, a cyclic shift direction shown in FIG. 11. A cyclic shift step is not limited. For example, the cyclic shift step may be determined based on a CP length and a number of a transmit symbol (for example, an number assigned to the transmit symbol). For another example, the cyclic shift step is a preset value, for example, may be an empirical value. For another example, the cyclic shill step may be any value less than lengths of the first sequence (namely, the first UW segment) and the second sequence (namely, the second UW segment).

The cyclic shift is used, so that the end position of the first UW segment is located after the second reference point, and the end position of the second UW segment is located after the first reference point (cyclic shifted to a header of the symbol).

Figure 12:
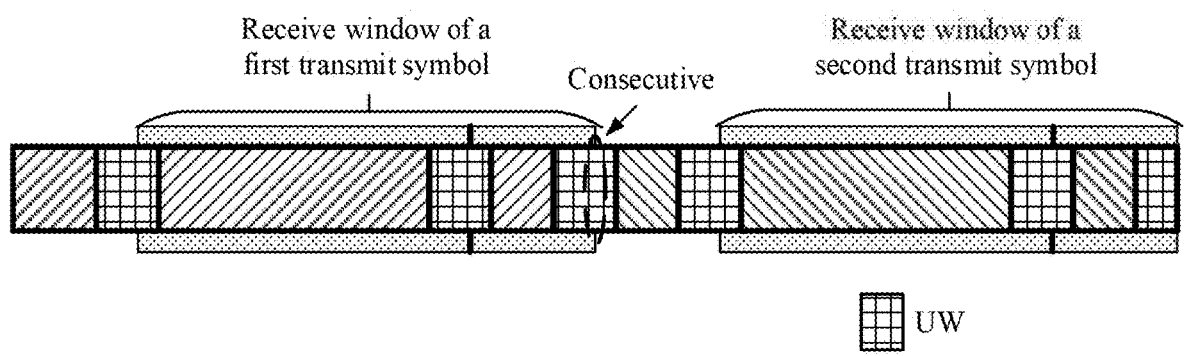
FIG. 12 is a schematic diagram of two consecutive symbols after cyclic shift applicable to an embodiment of this application.

FIG. 12 is a schematic diagram of two consecutive symbols after cyclic shift. After the cyclic shift is performed on the first transmit symbol and the second transmit symbol, in the manner shown in FIG. 11, phases of the first transmit symbol and the second transmit symbol may become continuous. The continuous phase not only improves CP extension performance, for example, an improved multipath resistance effect the CP (namely, an equivalent guard period), but also reduces an adjacent channel leakage ratio (ACLR) of a waveform, thereby improving performance.

(2) Cyclic Shift Occasion

Implementation 1: Cyclic shift may be performed before DFT, that is, cyclic shift is performed on a vector $x_i$. Alternatively, cyclic shift may be performed after IFFT and before a CP is added.

In the application scenario 1, the cyclic shift occasion may include (1), (2), and (3) shown in FIG. 6. In the application scenario 2, the cyclic shift is performed after the mapping operation and before the CP is added, for example, performed at an occasion shown in (4) in FIG. 7.

Optionally, in an embodiment shown in FIG. 8, the transmit symbol is a DFT-s-OFDM symbol, and the processing on the first set to which the first sequence and the second sequence are mapped may include the following operations: performing frequency domain processing on the first set to obtain a frequency domain signal corresponding to the first set; performing IFFT on a frequency domain signal corresponding to the first set to obtain a time domain signal corresponding to the first set; and performing cyclic shift on the time domain signal corresponding to the first set, so that the end position of the first sequence corresponds to a position after the second reference point, and the end position of the second sequence corresponds to a position after the first reference point.

It is assumed that cyclic shift is performed at an occasion shown in (3) in FIG. 6.

Figure 13:
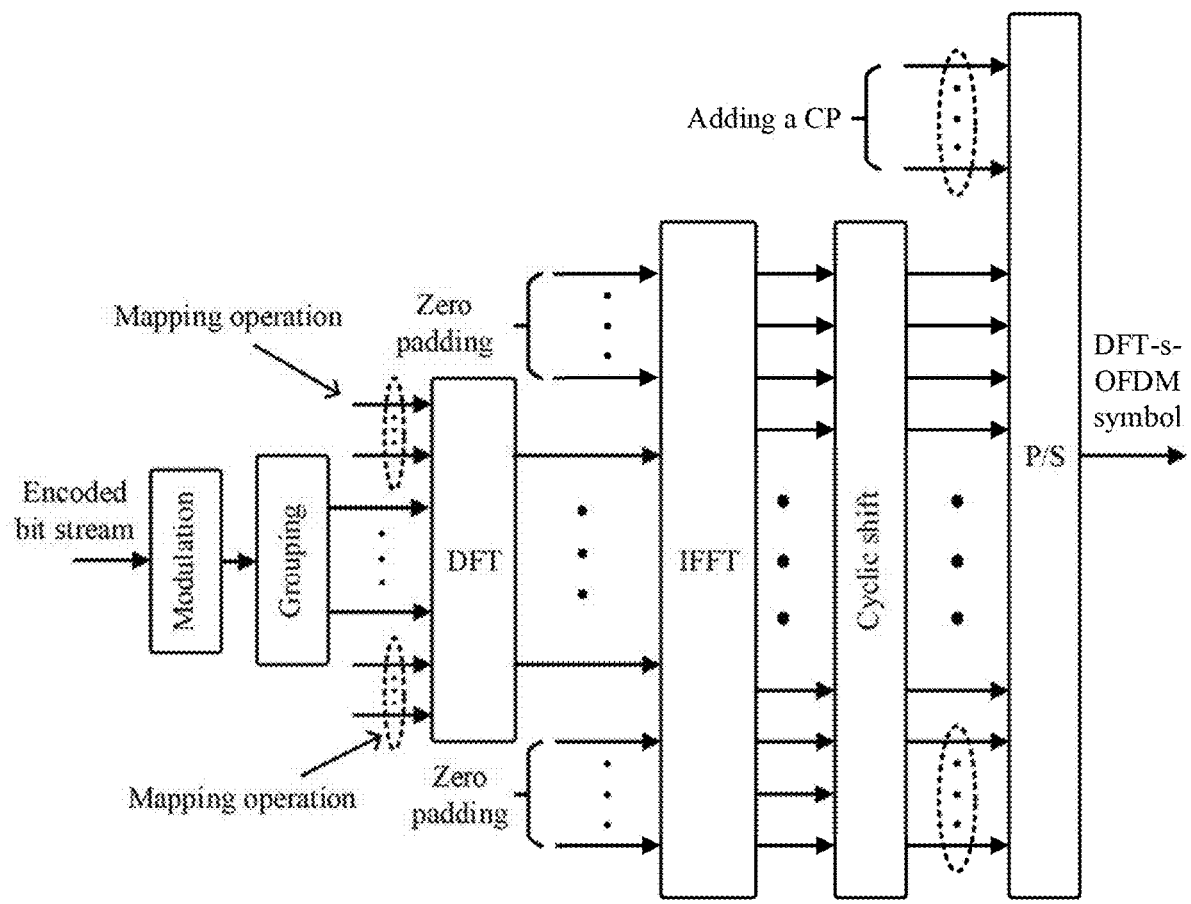
FIG. 13 is a schematic flowchart of symbol processing according to an embodiment of this application.

For example, the transmit symbol is a DFT-s-OFDM symbol. A process of generating the DFT-s-OFDM symbol in this application is shown in FIG. 13. The process includes the following steps. An encoded bit stream is modulated to obtain a plurality of modulated symbols, where the modulated symbols may be referred to as complex-valued symbols. This step may correspond to step S810 in this embodiment. The plurality of complex-valued symbols are grouped to obtain a plurality of sets. This step corresponds to step S820 in this embodiment. Mapping operation is performed on the plurality of sets. This step may correspond to step S830 in this embodiment. DFT is performed on a signal after the mapping operation. M-point frequency domain elements obtained after DFT transform are mapped to M consecutive subcarriers (not shown in FIG. 13), and a transmitter inserts zero or maps a remaining signal to a subcarrier other than the M subcarriers. After subcarrier mapping, IFFT transform is performed on the frequency domain signal. Cyclic shift is performed on a signal obtained after IFFT. A CP is added to a signal obtained after cyclic shift, and parallel/serial conversion (P/S conversion) is performed to finally obtain the DFT-s-OFDM symbol.

For example, grouping in this embodiment of this application may be implemented through serial/parallel conversion (S/P conversion).

Figure 14:
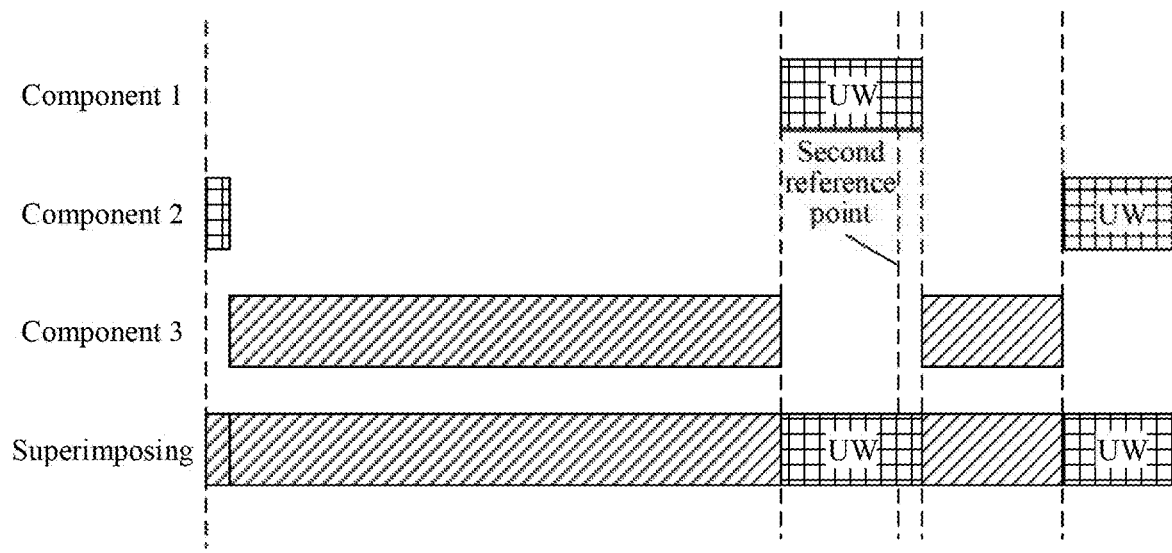
FIG. 14 is another schematic diagram of sequence mapping applicable to an embodiment of this application.

Implementation 2: Cyclic shift may also be implemented in a mapping operation. Description is made with reference to FIG. 14. As shown in FIG. 14, two UW segments are added to the set. That is, the end position of the first UW segment is located after the second reference point, and the end position of the second UW segment is located after the first reference point (cyclic shifted to a header of the symbol). Therefore, phases of the first transmit symbol and the second transmit symbol may become continuous. The continuous phase not only improves CP extension performance, for example, improves a multipath resistance effect the CP (namely, an equivalent guard period), but also reduces an ACLR of a waveform, so that the performance is improved.

Optionally, a length of the sequence may be greater than a CP length, or may be less than the CP length.

The first set is used as an example. A length of the first sequence may be greater than the CP length, or the length of the first sequence may be less than the CP length. Alternatively, a length of the second sequence may be greater than the CP length, or the length of the second sequence may be less than the CP length.

The CP length is the length of an equivalent guard period. For two transmit symbols that are consecutive in time domain, such as the first transmit symbol and the second transmit symbol, the second sequence of the first transmit symbol serves as a CP of the second transmit symbol, and generates a virtual CP greater than an original CP, such as an equivalent guard period shown in FIG. 4. For example, a length of the second sequence is greater than the CP length, that is, the length of the second sequence is greater than the length of the equivalent guard period.

Different cases are described in the following description.

(1) The length of the sequence is greater than the CP length.

Figure 15:
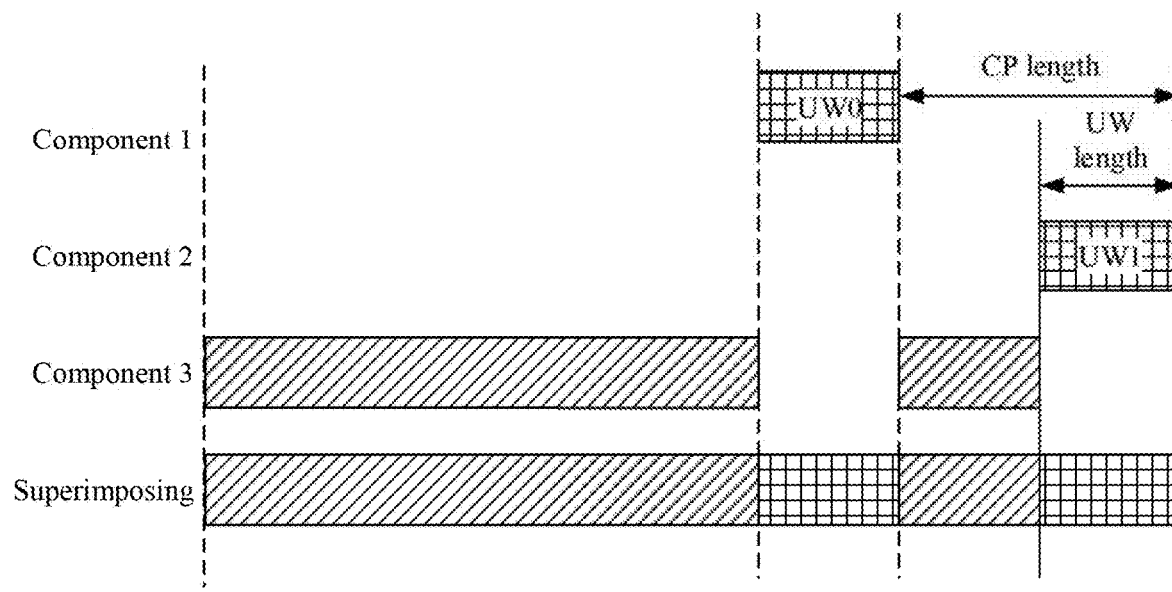
FIG. 15 and FIG. 16 are still other schematic diagrams of sequence mapping applicable to an embodiment of this application.

For example, in referring to FIG. 15, UW0 and UW1 are mapped to the set. The CP length is greater than a length of UW1. It can be learned that UW0 and UW1 are discontinuous.

Optionally, in this case, elements in UW0 and UW1 may be the same or may be different. This is not limited.

(2) The length of the sequence is less than the CP length.

Figure 16:
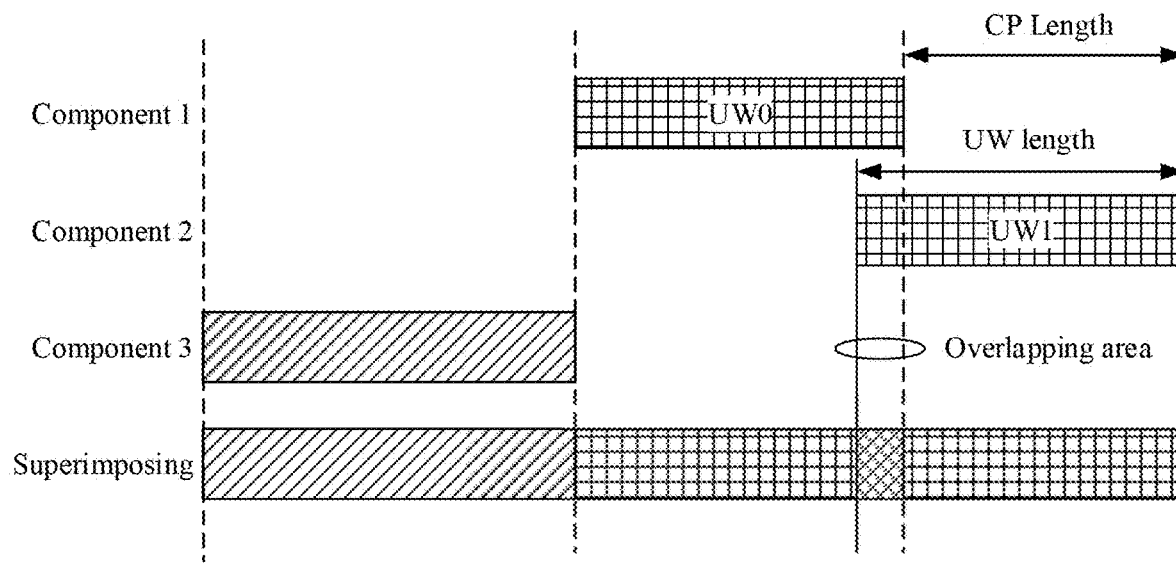

For example, in referring to FIG. 16, UW0 and UW1 are mapped to the set. The CP length is less than a length of UW1. It can be learned that UW0 and UW1 have an overlapping part.

Optionally, when the length of the second sequence is greater than the CP length, the tail of the first sequence and the header of the second sequence overlap, where an element in an overlapping part of the first sequence and an element in an overlapping part of the second, sequence are the same.

Elements at a tail of UW0 and a header of UW1 are the same. For example, an overlapping area in FIG. 16 belongs to both the tail of UW0 and the header of UW1.

In this application, mapping operation is performed on a set corresponding to each transmit symbol, that is, two sequences (for example, UW or ZT) are mapped to the set. An end position to which the first sequence is mapped is a position of intercepting a CP in the transmit symbol, and an end position to which the second sequence is mapped is an end position of the set, so that the length of a guard period may be flexibly configured based on a user requirement by using a sequence of a flexible length, such as UW or ZT, to implement flexible configuration of an inter-symbol guard period.

In addition, in some embodiments of this application, for a first transmit symbol and a second transmit symbol that are continuous in time domain, mapping operation is performed on each mapping symbol, so that a symbol component that is in the first transmit, symbol and whose end position is the first symbol component, and a symbol component that is in the second transmit symbol and whose end position is the second symbol component are the same. Therefore, the CP can be extended by using a sequence, such as UW or ZT, with a flexible length, so that an inter-symbol guard period is flexibly configured.

Therefore, in this application, when the CP length is fixed, a length of the guard period can be flexibly configured based on a user requirement by using a sequence, such as UW or ZT, with a flexible length, to implement flexible configuration of the inter-symbol guard period.

In addition, it should be understood that the length of the symbol component shared between the first transmit symbol and the second transmit symbol does not affect a frame structure of the transmit symbol. Therefore, for users with different channel conditions, by configuring the shared symbol components with different lengths, first, the inter-symbol guard period can be flexibly configured, and second, (frequency division, spatial division, and time division) multiplexing can also be performed between users configured with different guard periods.

It should be understood that, in addition to the embodiment provided in this specification, other solutions in which a transmit symbol having the time domain structure shown in FIG. 4 can be generated also fall within the protection scope of this application.

The embodiments described in this specification may be independent solutions, or may be combined based on internal logic. These solutions shall fall within the protection scope of this application.

It may be understood that, in the foregoing method embodiments, an execution body may be a terminal device or a component (for example, a chip or a circuit) that may be used in the terminal device, or may be a network device or a component (for example, a chip or a circuit) that may be used in the network device.

The foregoing describes the method embodiments provided in the embodiments of this application, and the following describes apparatus embodiments provided in the embodiments of this application. It should be understood that descriptions of the apparatus embodiments correspond to the descriptions of the method embodiments. Therefore, for content that is not described in detail, refer to the foregoing method embodiments. For brevity, details are not described herein again.

Figure 17:
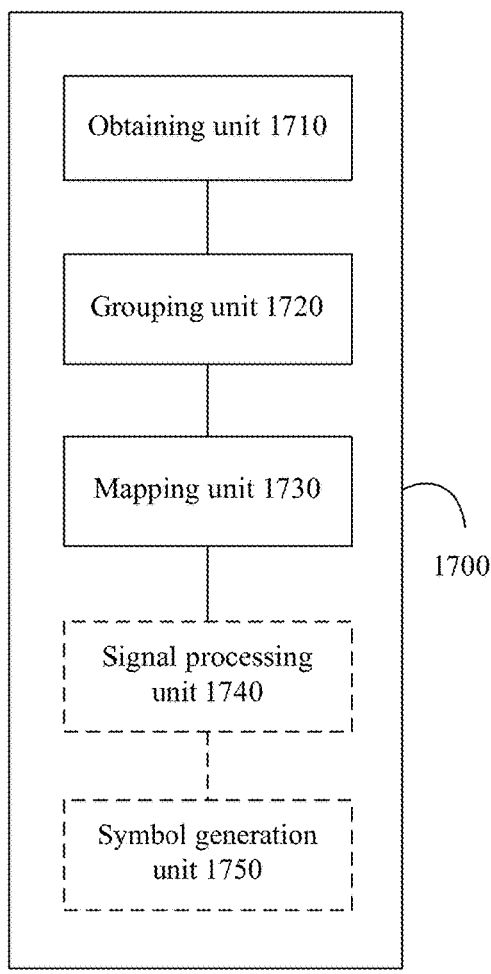
FIG. 17 is a schematic block diagram of a symbol processing apparatus according an embodiment of this application.

FIG. 17 is a schematic block diagram of a symbol processing apparatus 1700 according to an embodiment of this application. The apparatus 1700 may be configured to perform the foregoing method embodiments. The apparatus 1700 may include the following units:

an obtaining unit 1710, configured to obtain a plurality of complex-valued symbols;

a grouping unit 1720, configured to divide the plurality of complex-valued symbols into a plurality of sets, wherein each set corresponds to one transmit symbol, and the plurality of sets comprises a first set corresponding to a first transmit symbol; and a mapping unit 1730, configured to map a first sequence and a second sequence to the first set, where an end position to which the first sequence is mapped is a position of intercepting a cyclic prefix (CP) in the first transmit symbol, and an end position to which the second sequence is mapped is an end position of the first transmit symbol.

Optionally, the plurality of sets further includes a second set corresponding to a second transmit symbol, the fist transmit symbol and the second transmit symbol are consecutive in time domain, and the first transmit symbol is located before the second transmit symbol. The mapping unit 1730 is further configured to map the third sequence and the fourth sequence to the second set, where an end position to which the third sequence is mapped is a position of intercepting a CP in the second transmit symbol; and an end position to which the fourth sequence is mapped is an end position of the second transmit symbol, where the second sequence and the third sequence are the same.

Optionally, the apparatus 1700 further includes a signal processing unit 1740, and the signal processing unit 1740 is configured to perform frequency domain weighting and/or right cyclic shift on the first set to which the first sequence and the second sequence are mapped.

Optionally, a length of the first sequence and/or the second sequence is greater than a CP length; or a length of the first sequence and/or the second sequence is less than a CP length.

Optionally, the first sequence is a unique word sequence or an all-zero sequence, and the second sequence is a unique word sequence or an all-zero sequence.

Optionally, the first sequence and the second sequence are different.

Optionally, when the length of the second sequence is greater than the CP length, a tail of first sequence and a header of the second sequence overlap, where an element in an overlapping part of the first sequence and an element in an overlapping part of the second sequence are the same.

Optionally, in some embodiments, the apparatus 1700 further includes:

a symbol generation unit 1750, configured to generate a first transmit symbol based on a signal obtained after cyclic shift.

Optionally, the symbol generation unit 1750 is further configured to generate a second transmit symbol based on the signal obtained after cyclic shift, where a symbol component at an end position of the first transmit symbol and a symbol component at an end position of the second transmit symbol are the same.

Figure 18:
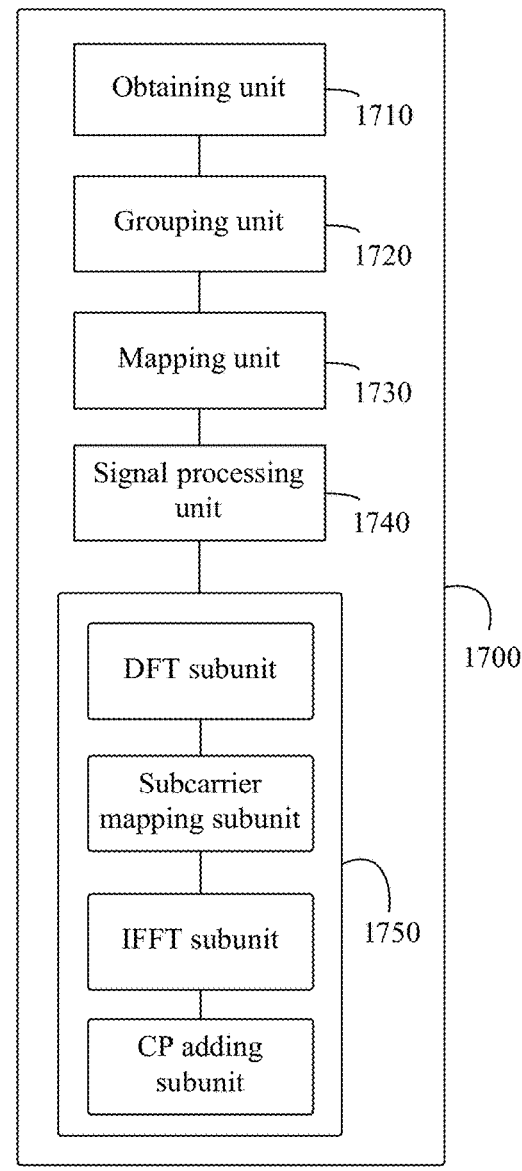
FIG. 18 is another schematic block diagram of a symbol processing apparatus according to an embodiment of this application.

Optionally, when the apparatus 1700 is applied to the application scenario 1, for example, as shown in FIG. 18, the symbol generation unit 1750 may include a DFT subunit, a subcarrier mapping subunit, an IFFT subunit, and a CP adding subunit.

In FIG. 18, the signal processing unit 1740 is located between the mapping unit 1730 and the symbol generation unit 1750. In this case, the signal processing unit 1740 may be referred to as a cyclic shift unit.

Optionally, the signal processing unit 1740 may be located in the symbol generation unit 1750.

For example, the signal processing unit 1740 is located between the DFT subunit and the IFFT subunit. In this case, the signal processing unit 1740 may be referred to as a frequency domain weighting unit.

For another example, the signal processing unit 1740 is located between the IFFT subunit and the CP adding subunit. In this case, the signal processing unit 1740 may be referred to as a cyclic shift unit.

Figure 19:
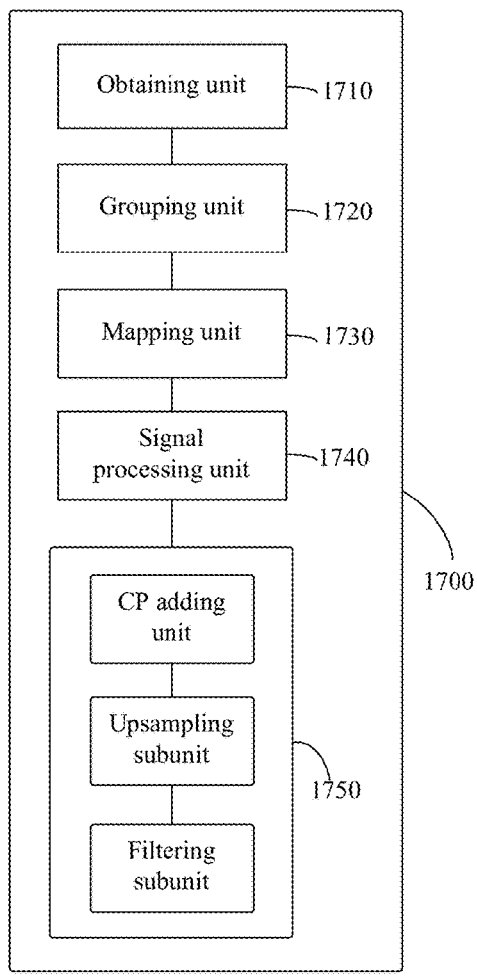
FIG. 19 is still another schematic block diagram of a symbol processing apparatus according to an embodiment of this application.

Optionally, when the apparatus 1700 is applied to the application scenario 2, for example, as shown in FIG. 19, the symbol generation unit 1750 may include a CP adding subunit, an upsampling subunit, and a filtering subunit. In this case, the signal processing unit 1740 may be referred to as a cyclic shift unit.

Figure 20:
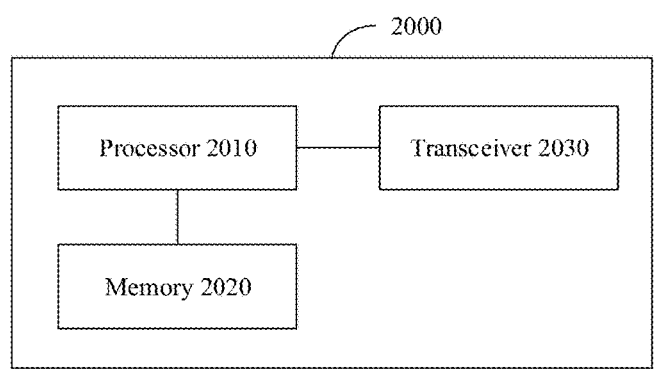
FIG. 20 is yet another schematic block diagram of a symbol processing apparatus according to an embodiment of this application.

As shown in FIG. 20, an embodiment of this application further provides a symbol processing apparatus 2000. The apparatus 2000 includes a processor 2010, a memory 2020, and a transceiver 1030. The memory 2020 stores a program. The processor 2010 is configured to execute the program stored in the memory 2020. Execution of the program stored in the memory 2020 enables the apparatus 2000 to be configured to perform the method embodiments in the foregoing specification.

An embodiment of this application further provides a communication apparatus. The communication apparatus may be a terminal device or a chip. The communication apparatus may be configured to perform the foregoing method embodiments.

Figure 21:
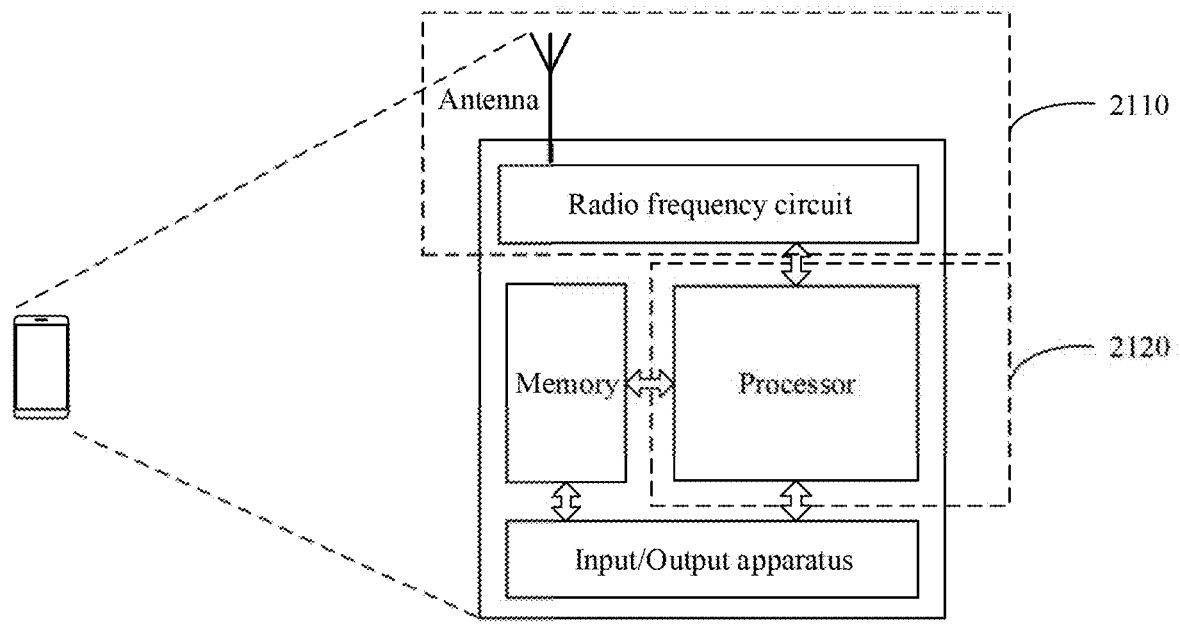
FIG. 21 is a schematic block diagram of a terminal device according to an embodiment of this application.

When the communication apparatus is terminal device, FIG. 21 is a simplified schematic diagram of a structure of the terminal device. For ease of understanding and convenience of figure illustration, an example in which the terminal device is a mobile phone is used in FIG. 21. As shown in FIG. 21, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is configured to store the software program and the data. The radio frequency circuit is configured to: perform conversion between a baseband signal and a radio frequency signal, and process the radio frequency signal. The antenna is configured to receive and send a radio frequency signal in a form of an electromagnetic wave. The input/output apparatus, such as a touchscreen, a display, or a keyboard, is configured to: receive data entered by a user and output data to the user. It should be noted that some types of terminal devices may have no input/output apparatus When needing to send data, after performing baseband processing on the to-be-sent data, the processor outputs a baseband signal to the radio frequency circuit the radio frequency circuit performs radio frequency processing on the baseband signal and then sends the radio frequency signal to the outside in a form of an electromagnetic wave by using the antenna. When data is received at the terminal device, the radio frequency circuit receives a radio frequency signal trough the antenna converts the radio frequency signal into a baseband signal, and outputs the baseband signal to the processor. The processor converts the baseband signal into data, and processes the data. For ease of description, FIG. 21 shows only one memory and one processor. In an actual terminal device product, there may be one or more processors and one or more memories. The memory may also be referred to as a storage medium, a storage device, or the like. The memory may be disposed independent of the processor, or may be integrated into the processor. This is not limited in this embodiment of this application.

In this embodiment of this application, an antenna and a radio frequency circuit that have receiving and sending functions may be considered as a transceiver unit of the terminal device, and a processor that has a processing function may be considered as a processing unit of the terminal device.

As shown in FIG. 21, the terminal device includes a transceiver unit 2110 and a processing unit 2120. The transceiver unit 2110 may also be referred to as a transceiver, a transceiver machine, a transceiver apparatus, or the like. The processing unit 2120 may also be referred to as a processor, a processing board, a processing module, a processing apparatus, or the like. Optionally, a component that is in the transceiver unit 2110 and that is configured to implement a receiving function may be considered as a receiving unit, and a component that is in the transceiver unit 2110 and that is configured to implement a sending function may be considered as a sending unit. That is, the transceiver unit 2110 includes a receiving unit and a sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

For example, in an implementation, the processing unit 2120 is configured to perform the foregoing method embodiments. The transceiver unit 2110 is configured to perform related receiving and sending operations in the foregoing method embodiments. For example, the transceiver unit 2110 is configured to send or receive a DFT-s-OFDM symbol or an SC-QAM symbol.

It should be understood that FIG. 21 is merely shown as an example instead of a limitation. The terminal device including the transceiver unit and the processing unit may not depend on the structure shown in FIG. 21.

When the communication apparatus is a chip, the chip includes a transceiver unit and a processing unit. The transceiver unit may be an input/output circuit or a communication interface. The processing unit may be a processor, a microprocessor, or an integrated circuit, integrated on the chip.

Figure 22:
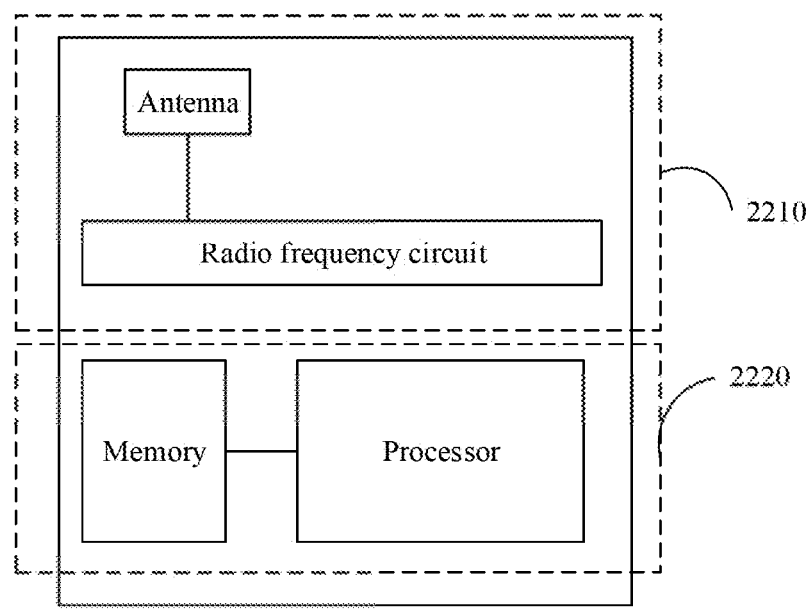
FIG. 22 is a schematic block diagram of a network device according to an embodiment of this application.

An embodiment of this application further provides a communication apparatus. The communication apparatus may be a network device or a chip. The communication apparatus may be configured to perform the foregoing method embodiments. When the communication apparatus is a network device, for example, a base station, FIG. 22 is a simplified schematic diagram of a structure of the base station. The base station includes a part 2210 and a part 2220. The part 2210 is configured to: send and receive a radio frequency signal, and perform conversion between the radio frequency signal and a baseband signal. The part 2220 is configured to: perform baseband processing, control the base station, and the like. The part 2210 may usually be referred to as a transceiver unit, a transceiver machine, a transceiver circuit, a transceiver, or the like. The part 2220 is usually a control center of the base station, and may usually be referred to as a processing unit, and is configured to control the base station to perform processing operations on a network device side in the foregoing method embodiments.

The transceiver unit in the part 2210 may also be referred to as a transceiver machine, a transceiver, or the like. The transceiver unit includes an antenna and a radio frequency unit. The radio frequency unit is mainly configured to perform radio frequency processing. Optionally, a component that is in the part 2210 and that is configured to implement a receiving function may be considered as a receiving unit, and a component that is in the part 2210 and that is configured to implement a sending function may be considered as a sending unit. That is, the part 2210 includes the receiving unit and the sending unit. The receiving unit may also be referred to as a receiver machine, a receiver, a receiver circuit, or the like, and the sending unit may be referred to as a transmitter machine, a transmitter, a transmitter circuit, or the like.

The part 2220 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the part 2220 is configured to perform the foregoing method embodiments. The part 2210 is configured to perform related receiving and sending operations in the foregoing method embodiments. For example, the part 2210 is configured to send or receive a OFT-s-OFDM symbol or an SC-QAM symbol.

It should be understood that FIG. 22 is merely shown as an example instead of a limitation. The network device including the transceiver unit and the processing unit may not depend on the structure shown in FIG. 22.

When the communication apparatus is a chip, the chip includes a transceiver unit and a processing unit. The transceiver unit may be an input/output circuit or a communication interface, The processing unit may be a processor, a microprocessor, or an integrated circuit, integrated on the chip.

The terminal device in the embodiments of this application includes a handheld device, a vehicle-mounted device, a wearable device, or a computing device that has a wireless communication function. For example, the terminal device may be user equipment (UE), an access terminal, a subscriber unit, a subscriber station, a mobile station, a remote station, a remote terminal, a mobile device, a user terminal, a terminal, a wireless communication device, a user agent, or a user apparatus. For example, the terminal device may be a mobile phone, a tablet computer, or a computer with a wireless transceiver function, The terminal device may alternatively be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, a wearable device, a vehicle-mounted device, or the like. The terminal device may be a terminal device in a 5G network, a terminal device in a future evolved public land mobile communication network (PLMN), or the like.

The network device in the embodiments of this application may be configured to communicate with one or more terminal devices, or may be configured to communicate with one or more base stations having some terminal functions (for example, communication between a macro base station and a micro base station, such as an access point). The network device may be referred to as a base station. The base station may be in a plurality of forms for example, a macro base station, a micro base station, a relay station, and an access point. For example, the network device in the embodiments of this application may be a base station in new radio (new radio, NR), or may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in a long term evolution (LTE) system. A base station in 5G NR may also be referred to as a transmission reception point (TRP) or a next generation NodeB (gNB).

An embodiment of this application further provides a processing apparatus, including a processor and an interface. The processor may be configured to perform the method in the foregoing method embodiments.

It should be understood that the processing apparatus may be a chip. For example, the processing apparatus may be a field programmable gate array (field programmable gate array, FPGA), an application-specific integrated circuit (ASIC), a system on chip (SoC), a central processing unit (CPU), a network processor (NP), a digital signal processing circuit (DSP), a micro controller unit (MCU), a programmable controller (PLD), or another integrated chip.

An embodiment of this application further provides a computer-readable storage medium. A computer program is stored in the computer-readable storage medium. When the computer program is executed by a computer, the computer is enabled to implement the foregoing method embodiments.

An embodiment of this application further provides a computer program product including instructions. When the instructions are executed by a computer, the computer is enabled to implement the foregoing method embodiments.

For explanations and beneficial effects of related content of either of the communication apparatuses provided above, refer to corresponding method embodiments provided above, Details are not described herein again.

In the embodiments of this application, the terminal device or the network device includes a hardware layer, an operating system layer running on the hardware layer, and an application layer running, on the operating system layer. The hardware layer includes hardware such as a central processing unit (CPU), a memory management unit (MMU), and a memory (which is also referred to as a main memory). The operating system may be any one or more computer operating, systems that implement service processing through a process (process), for example, a Linux operating system, a Unix operating system, an Android operating system, an iOS operating system, or a Windows operating system. The application layer includes applications such as a browser, art address book, word processing software, and instant messaging software. In addition, a specific structure of, an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc for example, a compact disc (CD) and a digital versatile disc (DVD)), a smart card, and a flash memory component (for example, an erasable programmable read-only memory (EPROM), a card, a stick, or a key drive. In addition, various storage media described in this specification may indicate one or more devices and/or other machine-readable media that are configured to store information. The term "machine-readable media" as a include but is not limited to radio channels and various other media that can store, include, and/or carry instructions and/or data.

It should be understood that, the processor mentioned in the embodiments of this application may be a CPU, or may be another general-purpose processor, a DSP, an ASIC, an FPGA, or another programmable logic device, a discrete gate or transistor logic device, a discrete hardware component, or the like. The general-purpose processor may be a microprocessor, or the processor may be any conventional processor or the like.

It should be further understood that the memory mentioned in the embodiments of this application may be a volatile memory or a nonvolatile memory, or may include both a volatile memory and as nonvolatile memory The nonvolatile memory may be a read-only, memory (ROM), a programmable read-only memory (PROM) an erasable programmable read-only memory (EPROM), an electrically erasable programmable read-only memory (EEPROM), or a flash memory. The volatile memory may be a random access memory RAM), used as an external cache. Through example but not limitative description, many forms of RAMS may be used, for example, a static random access memory (Static RAM, SRAM), a dynamic random access memory (DRAM), a synchronous dynamic random access memory (Synchronous DRAM, SDRAM), double data rate synchronous dynamic random access memory (DDR SDRAM), an enhanced synchronous dynamic random access memory (Enhanced SDRAM, ESDRAM), a synchlink dynamic random access memory (Synchlink DRAM, SLDRAM), and a direct rambus random access memory (DR RAM), It should be noted that when the processor is a general-purpose processor, a DSP, ASIC, an FPGA, or another programmable logic device, a discrete gate or a transistor logic device, or a discrete hardware component, the memory (storage module) is integrated into the processor.

It should be noted that the memory described in this specification includes but is not limited to these and any memory of another proper type.

A person of ordinary skill in the art may be aware that, in combination with units and algorithm steps of the examples described in the embodiments disclosed in this specification, this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated, and parts displayed as units may or may not be physical units, that is, may be located in one position, or may be distributed on a plurality of network units. Same or all of the units may be selected based on actual requirements to achieve the objectives of the solutions in the embodiments.

In addition, the functional units in the embodiments of this application may be integrated into one processing unit, or each of the units may exist alone physically or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes various media that can store program code, such as a USB flash drive, a removable hard disk, a read-only memory (ROM), a random access memory (RAM), a magnetic disk, and an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A symbol processing method, comprising:
obtaining a plurality of complex-valued symbols;
dividing the plurality of complex-valued symbols into a plurality of sets, wherein each set corresponds to one transmit symbol, and the plurality of sets comprise a first set corresponding to a first transmit symbol;
mapping a first sequence and a second sequence to the first set, wherein an end position to which the first sequence is mapped is a position of intercepting a cyclic prefix (CP) in the first transmit symbol, and an end position to which the second sequence is mapped is an end position of the first transmit symbol; and
performing frequency domain weighting and/or right cyclic shift on the first set to which the first sequence and the second sequence are mapped.

2. The method according to claim 1, wherein
the plurality of sets further comprises a second set corresponding to a second transmit symbol, the first transmit symbol and the second transmit symbol are consecutive in time domain, and the first transmit symbol is located before the second transmit symbol in time domain; and
the method further comprises:
mapping a third sequence and a fourth sequence to the second set, wherein an end position to which the third sequence is mapped is a position of intercepting a CP in the second transmit symbol; and an end position to which the fourth sequence is mapped is an end position of the second transmit symbol, wherein
the second sequence and the third sequence are the same.

3. The method according to claim 1, wherein
a length of the first sequence or the second sequence is greater than a CP length; or
a length of the first sequence or the second sequence is less than a CP length.

4. The method according to claim 1, wherein
the first sequence is a unique word sequence or an all-zero sequence, and the second sequence is a unique word sequence or an all-zero sequence.

5. The method according to claim 1, wherein
the first sequence and the second sequence are different.

6. The method according to claim 1, wherein
when the length of the second sequence is greater than a CP length, a tail of the first sequence and a header of the second sequence overlap, wherein
an element in an overlapping part of the first sequence and an element in an overlapping part of the second sequence are the same.

7. A symbol processing apparatus, comprising:
at least one processor; and
one or more memories coupled to the at least one processor and the at least one processor invokes programming instructions stored in the one or more memories, and is configured to execute the programming instructions to cause the apparatus to:
obtain a plurality of complex-valued symbols;
divide the plurality of complex-valued symbols into a plurality of sets, wherein each set corresponds to one transmit symbol, and the plurality of sets comprise a first set corresponding to a first transmit symbol;
map a first sequence and a second sequence to the first set, wherein an end position to which the first sequence is mapped is a position of intercepting a cyclic prefix (CP) in the first transmit symbol, and an end position to which the second sequence is mapped is an end position of the first transmit symbol; and
perform frequency domain weighting and/or right cyclic shift on the first set to which the first sequence and the second sequence are mapped.

8. The apparatus according to claim 7, wherein
the plurality of sets further comprises a second set corresponding to a second transmit symbol, the first transmit symbol and the second transmit symbol are consecutive in time domain, and the first transmit symbol is located before the second transmit symbol in time domain; and
the processor is further configured to map a third sequence and a fourth sequence to the second set, wherein an end position to which the third sequence is mapped is a position of intercepting a CP in the second transmit symbol; and an end position to which the fourth sequence is mapped is an end position of the second transmit symbol, wherein
the second sequence and the third sequence are the same.

9. The apparatus according to claim 7, wherein
a length of the first sequence or the second sequence is greater than a CP length; or
a length of the first sequence or the second sequence is less than a CP length.

10. The apparatus according to claim 7, wherein
the first sequence is a unique word sequence or an all-zero sequence, and the second sequence is a unique word sequence or an all-zero sequence.

11. The apparatus according to claim 7, wherein
the first sequence and the second sequence are different.

12. The apparatus according to claim 7, wherein
when the length of the second sequence is greater than a CP length, a tail of the first sequence and a header of the second sequence overlap, wherein
an element in an overlapping part of the first sequence and an element in an overlapping part of the second sequence are the same.

\* \* \* \* \*

UNITED STATES PATENT AND TRADEMARK OFFICE
CERTIFICATE OF CORRECTION

| | |
|---|---|
| PATENT NO. | : 11,770,281 B2 |
| APPLICATION NO. | : 17/573318 |
| DATED | : September 26, 2023 |
| INVENTOR(S) | : Fengwei Liu et al. |

It is certified that error appears in the above-identified patent and that said Letters Patent is hereby corrected as shown below:

In the Specification

In Column 1, Line 10, delete "tiled" and insert -- filed --.

Signed and Sealed this
Seventh Day of November, 2023

*Katherine Kelly Vidal*

Katherine Kelly Vidal
*Director of the United States Patent and Trademark Office*